United States Patent
Anand et al.

(10) Patent No.: US 10,817,203 B1
(45) Date of Patent: Oct. 27, 2020

(54) CLIENT-CONFIGURABLE DATA TIERING SERVICE

(71) Applicant: Amazon Technologies, Inc., Seattle, WA (US)

(72) Inventors: Manu Anand, Hyderabad (IN); Lalit Jain, Seattle, WA (US); Aman Singhal, Hyderabad (IN); Visakh Sakthidharan Nair, Bangalore (IN); Ajit Balachandran, Vancouver (CA); Kumar Shubhankar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/690,175

(22) Filed: Aug. 29, 2017

(51) Int. Cl.
*G06F 3/06* (2006.01)
*G06F 16/22* (2019.01)

(52) U.S. Cl.
CPC .......... *G06F 3/0647* (2013.01); *G06F 3/0604* (2013.01); *G06F 3/0643* (2013.01); *G06F 16/22* (2019.01); *G06F 3/067* (2013.01)

(58) Field of Classification Search
CPC ...... G06F 3/0647; G06F 3/0604; G06F 3/067; G06F 3/0643; G06F 17/30312; G06F 11/1448; G06F 11/1451; G06F 16/185; G06F 16/11; G06F 11/2094; G06F 16/27; G06F 2201/84
See application file for complete search history.

(56) References Cited

U.S. PATENT DOCUMENTS

| | | | |
|---|---|---|---|
| 5,404,510 A | | 4/1995 | Smith et al. |
| 5,564,037 A | * | 10/1996 | Lam ...................... G06F 3/0608 707/999.202 |
| 5,918,225 A | | 6/1999 | White et al. |
| 6,502,088 B1 | | 12/2002 | Gajda et al. |
| 6,591,269 B1 | | 7/2003 | Ponnekanti |
| 6,778,977 B1 | | 8/2004 | Avadhanam et al. |
| 6,914,883 B2 | | 7/2005 | Dharanikota |

(Continued)

OTHER PUBLICATIONS

U.S. Appl. No. 15/632,260, filed Jun. 23, 2017, Christopher Richard Jacques de Kadt, et al.

(Continued)

*Primary Examiner* — David Yi
*Assistant Examiner* — Tahilba O Puche
(74) *Attorney, Agent, or Firm* — Robert C. Kowert; Kowert, Hood, Munyon, Rankin & Goetzel, P.C.

(57) ABSTRACT

A client-configurable tiering service implements an interface allowing a client to specify a tiering policy selected from a plurality of supported tiering policies for data of the client stored in a warm tier, wherein the tiering policies specify conditions for relocating portions of the data to a cold tier. The interface also allows a client to specify a tombstone forwarding policy selected from a plurality of supported tombstone forwarding policies, wherein the tombstone forwarding policies specify how data relocated from the warm tier to the cold tier is subsequently retrieved in response to an access request directed to the warm tier. The client-configurable tiering service relocates and retrieves data between a warm tier and a cold tier in accordance with the client's selected policies. In some embodiments, a client may specify further aspects of how data is stored and relocated between different tiers of a data store.

20 Claims, 17 Drawing Sheets

(56) References Cited

U.S. PATENT DOCUMENTS

| | | | |
|---|---|---|---|
| 6,947,750 B2 | 9/2005 | Kakani et al. | |
| 8,239,584 B1 | 8/2012 | Rabe et al. | |
| 8,595,267 B2 | 11/2013 | Sivasubramanian et al. | |
| 8,850,130 B1 * | 9/2014 | Aron | G06F 9/52 711/150 |
| 8,918,435 B2 | 12/2014 | Sivasubramanian et al. | |
| 9,052,942 B1 * | 6/2015 | Barber | G06F 9/4843 |
| 9,432,459 B2 | 8/2016 | Sivasubramanian et al. | |
| 9,639,546 B1 | 5/2017 | Gorski et al. | |
| 9,754,009 B2 | 9/2017 | Sivasubramanian et al. | |
| 10,460,120 B1 * | 10/2019 | Stephens | G06F 16/2246 |
| 2002/0087699 A1 | 7/2002 | Karagiannis et al. | |
| 2007/0179990 A1 * | 8/2007 | Zimran | G06F 16/125 |
| 2007/0195788 A1 | 8/2007 | Vasamsetti et al. | |
| 2007/0266056 A1 * | 11/2007 | Stacey | G06F 16/185 |
| 2010/0281230 A1 * | 11/2010 | Rabii | G06F 3/0605 711/165 |
| 2012/0317155 A1 | 12/2012 | Ogasawara et al. | |
| 2013/0268740 A1 * | 10/2013 | Holt | G06F 21/00 711/163 |
| 2017/0116298 A1 * | 4/2017 | Ravipati | G06F 17/30368 |

OTHER PUBLICATIONS

U.S. Appl. No. 15/051,560, filed Feb. 23, 2017, Karthik Tamilmani.
U.S. Appl. No. 15/583,921, filed May 1, 2017, Gorski, et al.
U.S. Appl. No. 15/861,508, filed Jan. 3, 2018, Manu Anand.
U.S. Appl. No. 15/866,332, filed Jan. 9, 2018, Manu Anand.
U.S. Appl. No. 16/367,100, filed Mar. 27, 2019, Binu Kuttikkattu Idicula.

* cited by examiner

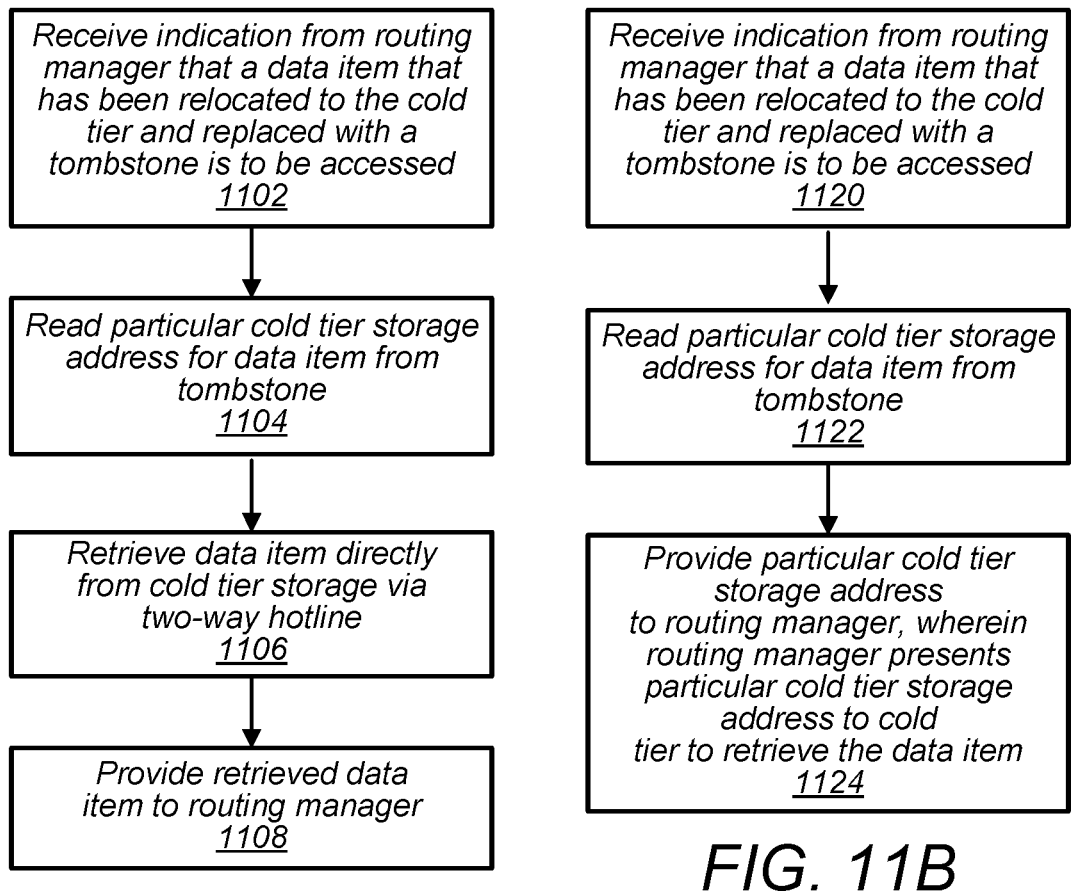
FIG. 11A
FIG. 11B
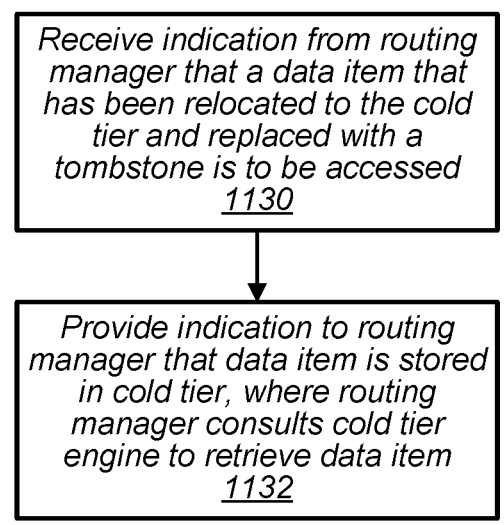
FIG. 11C

US 10,817,203 B1

CLIENT-CONFIGURABLE DATA TIERING SERVICE

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to web servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers.

As the scale and scope of distributed systems have increased, the tasks of provisioning, administering, and managing resources of the distributed systems have become increasingly more complicated. A distributed system referred to as a provider network may offer, to various customers, access to computing resources and services implemented using the distributed system. When customers access such resources remotely, the resources may be said to reside "in the cloud" and may represent cloud computing resources. For example, using such resources, the provider network may store data on behalf of clients in various types of storage solutions. The provider network may offer various types of services for managing the cloud computing resources, including storage-related services for managing stored data.

For various reasons, some pieces of data stored in a distributed system for a customer may be accessed less frequently than other pieces of data. Also delays in access to some pieces of data stored in a distributed system for a customer may have less of an impact on the customer's operations than delays in accessing other pieces of data stored in the distributed system for the customer. Thus different pieces of data may be assigned different access requirements and accordingly may be stored in storage systems having different levels of performance. Also access requirements for different pieces of data may vary for other reasons. In some situations, such access requirements may change over time and/or may change due to changing circumstances. As access requirements change, some pieces of data stored in a distributed system may end up being stored on resources that meet greater (and more costly) access requirements for the pieces of data than necessary to meet the customer's needs. For customers that store large quantities of such pieces of data, storage of the pieces of data in such higher performance resources may lead to an inefficient allocation of storage resources and unnecessary storage costs for the customers.

BRIEF DESCRIPTION OF THE DRAWINGS

FIG. 11A is a flowchart illustrating a node of a warm (primary) tier interacting with a resource manager to access a data item that has been relocated to a cold (secondary) tier, according to some embodiments.

FIG. 11B is a flowchart illustrating a node of a warm (primary) tier interacting with a resource manager to access a data item that has been relocated to a cold (secondary) tier, according to some embodiments.

FIG. 11C is a flowchart illustrating a node of a warm (primary) tier interacting with a resource manager to access a data item that has been relocated to a cold (secondary) tier, according to some embodiments.

Figure 1:
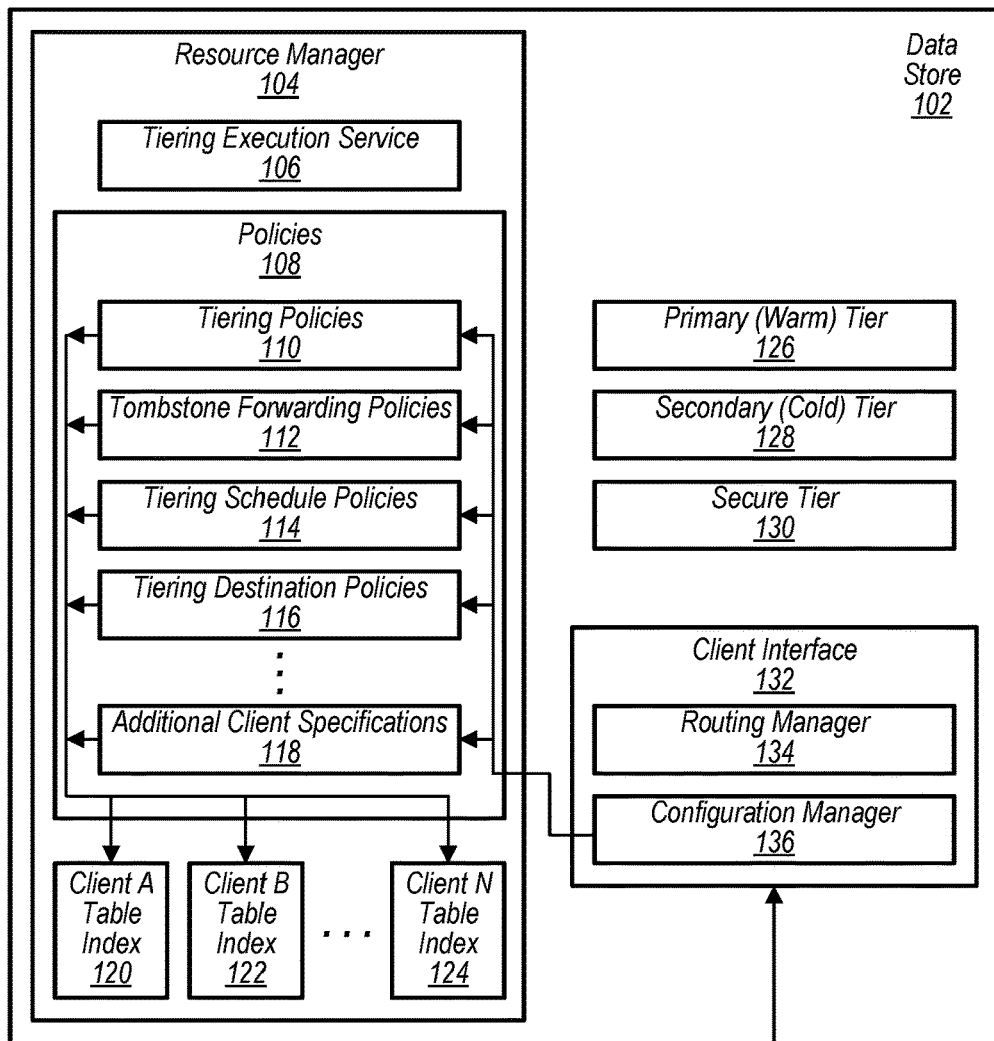
FIG. 1 illustrates a data store comprising a configuration manager and a resource manager that implement client specified tiering policies and/or other client specified policies for tables stored in the data store, according to some embodiments.
Figure 1:
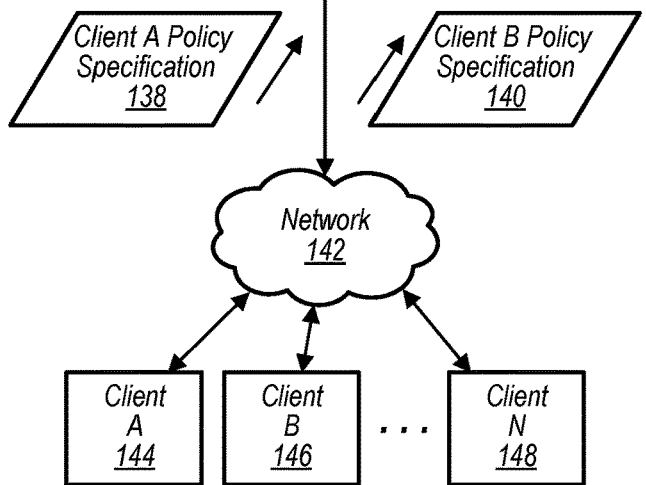

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for configuring a data store in accordance with client selected policies or configuring a data tiering service for a data store in accordance with client selected policies are described herein.

In one embodiment, a system includes a data store comprising a warm (primary) tier and a cold (secondary) tier. In some embodiments, the primary or "warm" tier may be a database system and a secondary or "cold" tier may be an object-based data storage system. The warm tier may typically be more expensive for a unit of data and have lower latency for data access than the cold tier. The system also includes a configuration manager configured to implement a programmatic interface allowing a client of the data store to select one or more policies to be applied to the client's data stored in the data store. The configuration manager is configured to receive, via the programmatic interface, one or more of an indication of a selected tiering policy comprising conditions upon which one or more pieces of the client's data are to be relocated from the warm tier to the cold tier; or an indication of a selected tombstone forwarding policy for accessing the client's data that has been relocated to the cold tier.

For example, the data store may support a plurality of tiering policies such as a time based tiering policy, an access pattern based tiering policy, a metadata based tiering policy, a prefix based tiering policy, a size based tiering policy, etc. and a configuration manager of the data store may allow a client to select one or more of the tiering policies offered by the data store as a tiering policy to be applied to respective tables or scopes of the client that are stored or to be stored in the data store.

In addition, the data store may support a plurality of tombstone forwarding policies, such as a tombstone forwarding policy wherein a warm tier tombstone includes sufficient address information for a warm tier node to directly access data stored in a cold tier node storing a relocated data item via a two-way hotline, a tombstone forwarding policy wherein a warm tier tombstone includes address information that is provided to a routing manager to locate a relocated data item that has been relocated to a cold tier, or a tombstone forwarding policy wherein a tombstone simply indicates that a data item has been relocated to a cold tier and a routing manager consults a cold tier engine to ascertain address information for locating the relocated data item in the cold tier.

In addition, the system also includes a resource manager configured to relocate the one or more pieces of the client's data from the warm tier to the cold tier in accordance with the conditions included in the selected tiering policy and include one or more respective tombstones in the warm tier each comprising an indication of a location for a piece of the client's data that has been relocated from the warm tier to the cold tier, wherein the respective indications included in the one or more tombstones are in accordance with the selected tombstone forwarding policy. In some embodiments, the resource manager and the configuration manager may be included in a data storage system or may be a separate service that interacts with a data store to perform tiering as described herein.

The routing manager of the system is configured to receive a request directed to a piece of the client's data that has been relocated from the warm tier to the cold tier; locate a tombstone included in the warm tier corresponding to the piece of the client's data that has been relocated to the cold tier; receive the piece of the client's data stored in the cold tier, wherein the piece of the client's data stored in the cold tier is accessed based on the indication of the location included in the tombstone in the warm tier; and provide the received piece of data in response to the request.

In some embodiments, a method includes receiving, via a programmatic interface, one or more of: an indication of a selected tiering policy comprising conditions upon which client data stored in a warm tier of a data store is to be relocated from the warm tier to a cold tier of the data store; or an indication of a selected tombstone policy for accessing data that has been relocated from the warm tier to the cold tier. The method further includes relocating, upon the conditions being met, data from the warm tier to the cold tier in accordance with the selected tiering policy and including a tombstone in the warm tier indicating a location where the data has been relocated, wherein the location of the tombstone is in accordance with the selected tombstone policy. The method also includes, in response to receiving an access request for the data that has been relocated from the warm tier to the cold tier, locating the data in the cold tier based on the location included in the tombstone of the warm tier.

In some embodiments, a non-transitory computer readable medium storing program instructions that, when executed by one or more processors, cause the one or more processors to: provide a copy of a piece of data to a cold tier of a data store; include a tombstone in a warm tier comprising an address in the cold tier at which the copy of the piece of data is stored; and in response to an access request for the piece of data, retrieve the piece of data from the cold tier using the address stored in the tombstone of the warm tier. In some embodiments, the non-transitory computer readable medium storing the program instructions may be included in a device of a distributed storage system, such as a node of a warm tier of a data store.

In some embodiments, various tiers of a data store, such as a warm (primary) tier, a cold (secondary) tier, or a secure tier may be implemented using different storage subsystems or services that may provide different storage characteristics. This may allow a client to store less frequently accessed data in a cheaper storage subsystem or service, while storing more frequently accessed data in a lower latency storage subsystem or service. Thus a customer may be provided low latency access to frequently accessed data while reducing storage costs for infrequently accessed data. For example, a warm tier may be implemented using a database system such as Amazon DynamoDB, while a cold tier may be implemented using an object-based storage system such as Amazon Simple Storage Service (S3).

Typically, the warm tier may offer data access with lower latency than the cold tier. Due to the differing cost and performance characteristics of the tiers, the warm tier may be used to store more frequently accessed data and may be referred to as a "primary" tier, while the cold tier may be used to store less frequently accessed data (typically in larger quantities) and may be referred to as a "secondary" tier. Also, a secure tier may encrypt or otherwise protect a client's data stored in the secure tier. The data store and its constituent tiers may offer multi-tenancy to clients, e.g., clients of a provider network. Accordingly, the data store may also be referred to as a multi-tenant data store. The data store and its constituent tiers may offer dynamic sizing to clients such that the available capacity for a particular client's storage needs may be increased dynamically, e.g., using storage resources from a provider network. The data store may include any suitable number and configuration of storage tiers implemented using any suitable storage subsystems and/or storage services. In one embodiment, the type, number, and/or configuration of the different storage tiers may be configured by a client of the data store. Additionally, policies for using the various tiers (e.g., policies for deciding which tier to use for storing a particular data item) may be configured by a client of the data store.

The various tiers of a data store may store data items on behalf of a plurality of clients (also referred to herein as tenants or customers). The data items may be structured differently in different tiers. For example, in the warm tier, the data items may include key-value pairs, and the key-value pairs may be organized into data structures referred to as scopes or tables. The data items (e.g., key-value pairs) and/or data structures that contain them (e.g., scopes or tables) may be specific to particular clients, such that a particular data item or data structure may be said to belong to a particular client or to be owned by a particular client. The client that owns particular data items may have access to read, write, or modify those data items, in some cases exclusive of other clients. As another example, in the cold tier or secondary tier, the data items may be structured as objects and stored in secure, durable, highly scalable object storage in storage locations referred to as "buckets." An Amazon Simple Storage service (S3) object, for example, may include data, a key, and metadata; the object key (or key name) which uniquely identifies the key-addressable object in a bucket, and an index of such keys. In some embodiments, the cold tier may represent block-based storage (e.g., of 64 kilobyte blocks).

Clients may use devices to perform or request suitable operations for reading, writing, or modifying data items in a data store. The data store may expose a client interface to enable clients to participate in such operations. In some embodiments, a client interface may represent a single, unified interface to all the tiers (e.g., the warm tier, cold tier, and/or the secure tier(s)). The client interface may include any suitable user and/or programmatic interfaces, such as application programming interfaces (API) enabling operations such as "put" and "get."

In some embodiments, the tiers of a data store may be provided using one or more storage-related services, such as a relational database service, a non-relational or NoSQL database service, an object storage service that allows clients to store arbitrary amounts of data in the form of objects, a storage service that provides block-device level interfaces, and so on. A client of such a storage-related service may programmatically request the establishment of a portion of a data store, such as an instance of a (relational or non-relational) database that can be used for numerous database tables or scopes and associated metadata such as indexes and the like. In the case of an object storage service, at least a portion of a data store may include a collection of objects. In the case of a storage service providing block-device interfaces, the corresponding tier of the data store may be implemented using one or more volumes.

Generally speaking, the term "data store," as used herein, may refer to a collection of one or more data items and/or data objects and associated metadata set up on behalf of one or more clients. After a data store has been created, a client may start populating various data items within the data store, e.g., using requests for operations such as "create object," "update object," "insert object," "delete object," or other similar requests at various granularity levels depending on the data store type. For example, in the case of a database, operations such as creates, updates, and deletes may be supported at the table level, the data item level, and for various metadata objects such as indexes, views, and the like. Clients may also issue read requests of various kinds, such as queries in the case of database objects.

Also a client may control conditions that cause the client's data to be relocated between a warm tier and a cold tier or between secure tiers of a data store by selecting a tiering policy from a plurality of tiering policies supported by the data store. Additionally, a client may control how data that has been relocated from a warm tier to a cold tier or between secure tiers is accessed by selecting a tombstone forwarding policy from among a plurality of tombstone forwarding policies supported by the data store.

In some embodiments, tombstone forwarding policies may vary in regard to specificity of location information included in a tombstone for a data item that has been relocated from a warm tier. For example, in some embodiments a tombstone may include detailed storage address information for a data item that has been relocated to a cold tier storage such that a node of a warm tier may directly access the data item in the cold tier storage using the detailed storage address information and a two-way hotline between the warm tier node storing the tombstone and a cold tier node where the data item has been relocated.

In other embodiments, a tombstone may include slightly less detailed address information for a data item that has been relocated to a cold tier. For example, a tombstone may include address information indicating a portion of a cold tier storage wherein the data item has been relocated, but accessing the data item may further require at least some directory assistance from the cold tier to locate the data item in a particular portion of a cold tier storage of the cold tier or within a particular cold tier file stored in the cold tier storage.

In other embodiments, a tombstone forwarding policy may indicate that a tombstone is to merely include an indication that a data item has been relocated to a cold tier, wherein particular address information for a location of the data item in a cold tier storage of the cold tier is maintained in a cold tier file and not included in the tombstone. In such an embodiment, a cold tier engine may access the cold tier file in order to retrieve a particular address in the cold tier storage or in a cold tier file stored in the cold tier storage at which the data item that has been relocated.

Thus, a level of specificity of address information for a data item that has been relocated to a cold tier included in a tombstone may vary from merely indicating the data item has been relocated to a cold tier to including detailed address information for where the data item is stored in the cold tier. Depending on a client's particular use of the data store it may be more desirable to have shorter access times to data items relocated to a cold tier. Thus such a client may select a tombstone forwarding policy that includes detailed storage address information for a relocated data item in a tombstone. Other clients may desire to reduce an amount of data that remains in a warm tier for relocated data items by storing less detailed address information in a tombstone for a data item that has been relocated from a warm tier to a cold tier or secure tier. Thus, a client may select a tiering policy describing how client data is to be selected for tiering and may also select a tombstone forwarding policy that balances a need for quick access to data relocated from a warm tier to a cold tier with data sizes of tombstones that remain in the warm tier according to the client's specific needs. Once a client has selected policies for the client's data, such as a tiering policy and/or a tombstone forwarding policy, a tiering service or a resource manager included in a data store, may automatically tier the client's data per the client's selected policies without further intervention or action from the client.

Additionally, in some embodiments, a client may specify other policies for the client's database, table, scope, partition, etc. For example, a client may specify a tiering schedule that defines when respective ones of the client's tables, scopes, etc. are to be evaluated for tiering of data items included in the tables, scopes, etc. Also, a client may specify a format of a warm tier such as a relational database format, a No SQL database format, a MySQL database format, etc. In some embodiments, a client may select a service to function as a warm tier, such as Amazon's Dynamo DB. Also, in some embodiments, a client may select a format and/or service for a destination tier (e.g. cold tier, secure tier, etc.). For example, a client may select as an object based storage format or a block based storage format. In some embodiments, a client may select a service to function as a cold tier, such as Amazon Simple Storage Service (S3), Amazon Elastic Bock Storage (EBS), Amazon Glacier, etc. In some embodiments, a client may specify other policies for the client's databases, tables, scopes, etc. via a configuration manager for the data store.

Illustrative System Configuration

In some embodiments, a client-configurable data tiering service as described herein may be a standalone service that coordinates tiering of data stored in separate warm storage systems and cold storage systems. Also, a client-configurable data tiering service may coordinate tiering of data between separate services such as a database service and a higher latency storage service. In other embodiments, a client-configurable data tiering service may be included in or integrated into a data store that includes a plurality of different storage tiers.

For example, FIG. 1 illustrates a data store comprising a configuration manager and a resource manager that implement client specified tiering policies and/or other client specified policies for the data store, according to some embodiments. Configuration manager 136 and resource manager 104 are shown integrated into data store 102. However, in some embodiments resource manager 104 and configuration manager 136 may be included is a stand-alone service that is separate from a data store, such as data store 102, and that interacts with the data store or tiers of the data store to implement client specified tiering policies and/or other client specified policies for the data store.

System 100 as illustrated in FIG. 1 includes data store 102, but may also include additional services. For example, in some embodiments, system 100 may be a provider network that includes additional computing, storage, or networking resources or services offered to clients in addition to data store 102. Also, in some embodiments in which configuration manager 136 and resource manager 104 constitute a standalone client-configurable tiering service, they may coordinate tiering of data items stored in other services of a provider network, such as system 100, or may coordinate tiering of data items stored in third party storage services outside of a provider network, such as outside of system 100.

Data store 102 includes warm (primary) tier 126, cold (secondary) tier 128, and secure tier(s) 130. In some embodiments, warm tier 126 may be a database system and cold tier 128 may be an object-based data storage system. The warm tier 126 may typically be more expensive for a unit of data and have lower latency for data access than the cold tier 128. For example, in some embodiments warm tier 126 may be configured in accordance with various database formats or protocols, such as Aerospike, ArangoDB, Couchbase, Amazon Dynamo DB, FairCom c-tree ACE, Foundation DB, HyperDex, InfinityDB, MemcacheDB, MUMPS, Oracle NoSQL Database, OrientDB, Redis, Riak, Berkley DB, Google Engine, etc. In some embodiments, cold tier 128 tier may be implemented utilizing a lower cost storage service than is used for the warm tier 126, such as Amazon's Simple Storage Service (S3) or Amazon Glacier, as some examples. In some embodiments, data store 102 may include more than two tiers, e.g. a data store may include one or more additional lower tiers that have higher latencies and lower costs than the cold tier.

Also, in some embodiments, a data store, such as data store 102, may include secure tiers in addition to or in place of a warm and/or cold tier. For example, data store 102 includes secure tier(s) 130. In some embodiments, secure data may be stored in a secure tier or tiers instead of a warm or cold tier, such as warm tier 126 and cold tier 128. In some embodiments, a data store, such as data store 102, may include multiple secure tiers, such as secure tiers 130. In embodiments that include multiple secure tiers, one of the secure tiers may function as a warm secure tier and another one of the secure tiers may function as a cold secure tier. For example, data stored in secure tiers may be automatically relocated between secure tiers in accordance with a client specified tiering policy as described herein for warm tier 126 and cold tier 128. In some embodiments, data directed to and stored in a secure tier may be encrypted in transit and/or while at rest.

Data store 102 also includes client interface 132 and resource manager 104. In some embodiments resource manager 104 and client interface 132 may be included in a data store or, in other embodiments, client interface 132 and/or configuration manager 136 of client interface 132 and resource manager 104 may be included in a service that is separate from a data store and that interacts with a data store or data stores to cause data stored in the data store(s) to be tiered between warm and cold tiers.

Client interface 132 includes configuration manager 136 and routing manager 134. Configuration manager 136 may implement a programmatic interface configured to receive database policy selections, tombstone forwarding policy selections, tiering policy selections, tiering scheduling policy selections, and various other database policy selections from a client of a data store or from a client of a client-configurable data tiering service. For example, FIG. 1 illustrates client A 144 and client B 146 of data store 102 sending client A policy specifications 138 and client B policy specifications 140 to data store 102 via network 142 and configuration manager 136 of client interface 132 to data store 102.

In some embodiments, a resource manager, such as resource manager 104, includes a policy depository that stores policies, such as policies 108 that are supported by a data store, such as data store 102. A resource manager, such as resource manager 104, may also include an execution engine, such as tiering execution service 106. In some embodiments a tiering execution service or tiering engine executes tiering of data between a warm tier and a cold at defined time intervals in accordance with selected tiering policies specified by a client of a data store or a client of a client-configurable data tiering service.

In some embodiments, a client specification, such as client A policy specification 138, may specify one or more selected policies, such as ones of policies 108, that are to be applied to one or more tables or scopes of a client, such as client A 144. For example, a client may select policies that are to be applied to tables or scopes owned by the client. In some embodiments, a client's selected policies indicated in a client specification, such as client A policy specification 138, may be processed by a configuration manager, such as configuration manager 136. As part of or in response to, processing the client's specification, a configuration manager may add the client's specified policy preferences to a client table index for that client. For example, configuration manager 136 may add client A 144's policy selections included in client A policy specification 138 to client A table index 120.

In some embodiments, a tiering execution service, such as tiering execution service 106, may reach an execution interval for the tiering execution service, for example daily execution intervals or weekly execution intervals, and upon reaching the execution interval, the tiering execution service may evaluate a client's table index to determine if any of the client's tables are ripe for tiering. If so, the tiering execution service may then determine data items included in the ripe tables or scopes that are to be relocated to a cold or secondary tier in accordance with the client's selected tiering policy or policies.

Figure 2:
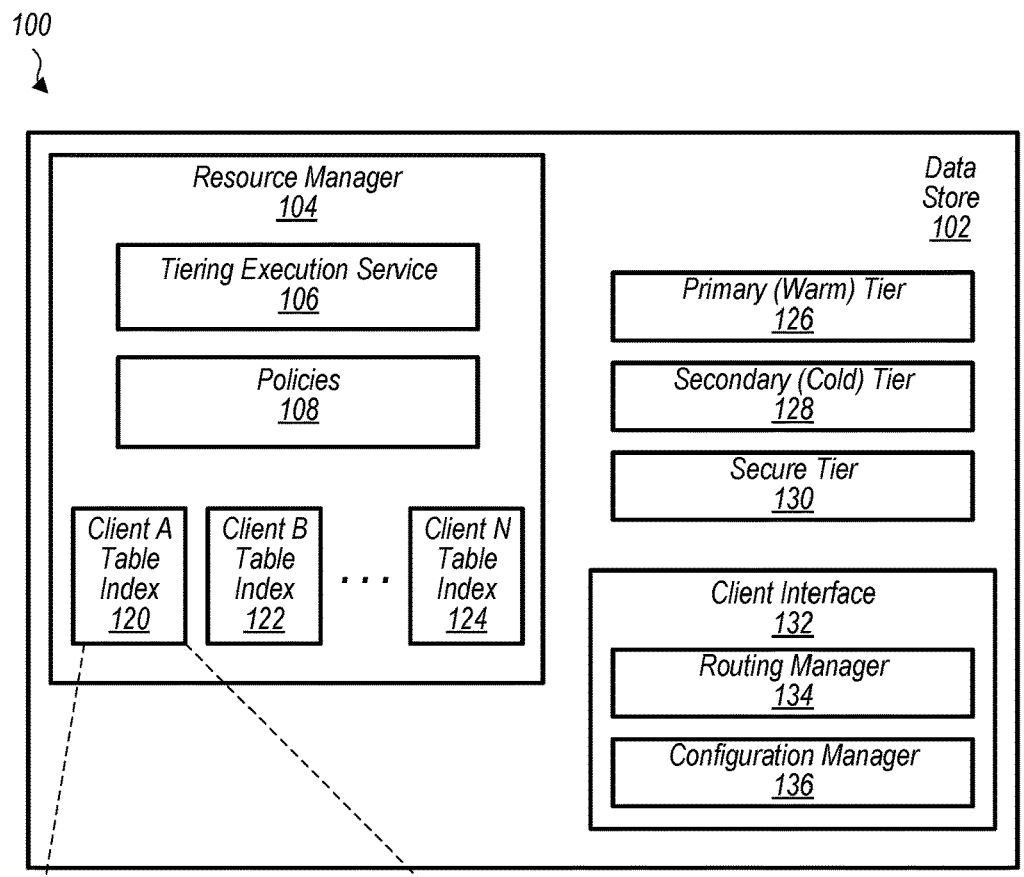
FIG. 2 illustrates a client table index that includes client specified policies for tables stored in a data store, according to some embodiments.

For example, FIG. 2 illustrates a client table index that includes client specified policies for tables stored in a data store, according to some embodiments. Client A table index 120 shown in FIG. 2 illustrates an example of client selections included in a table index for that client's tables. For example, client A may have selected, via client A policy specification 138, that client A's table 1 is to have a time-based tiering policy, which may be one of a plurality of tiering policies 110 supported by resource manager 104. Furthermore, client A may have selected that table 1 is to have a daily tiering schedule, which may be one of a plurality of tiering schedule policies 114, supported by resource manager 104. Also, client A may have selected that table 1 is to have a particular tombstone forwarding policy selected from a plurality of tombstone forwarding policies 112 supported by resource manager 104. In some embodiments, such selections may have been specified via one or more client policy specification messages, such as client A policy specification 138. Such selections may be added to a table index for the client's tables such as client A 144's table index 120.

In some embodiments, when an execution interval is reached for a tiering execution service associated with a resource manager, such as tiering execution service 106, the tiering execution service may evaluate one or more client table indexes, such as client A table index 120, client B table index 122, or client N table index 124 to determine if any of the tables included in the client table indexes are ripe for tiering evaluation. For example, the tiering execution service may determine that client A 144's table 1 is ripe for tiering evaluation, but may determine that client A 144's table 2 is not yet ripe for tiering evaluation.

As discussed in more detail in regard to FIGS. 10A-10E, the tiering execution service may identify one or more data items in a table that is ripe for tiering evaluation that are to be relocated to another storage tier, such as cold (secondary) tier 128. The determination of which data items are to be relocated may be performed in accordance with a client specified tiering policy for the client's table. For example, data items included in client A 144's table 1 may be evaluated according to a time based tiering policy, whereas data items included in client A 144's table 2 may be evaluated according to an access pattern based tiering policy.

Once data items to be relocated are identified, a resource manager, such as resource manager 104, may cause copies of the data items to be generated and may provide the copies to a cold tier storage, such as a cold tier storage 324 of cold tier 312. The cold tier storage may then provide an indication to the resource manager, for example resource manager 104, that the generated copy of the data item has been successfully added to the cold tier storage. In response to receiving confirmation that the generated data item copy has been successfully added to the cold tier, the resource manager may generate a tombstone with the same key as the generated data item copy provided to the cold tier. Furthermore, the resource manager may mark the original copy of the data item stored in the warm or primary tier for deletion and subsequently delete the original data item that has now been relocated to the cold tier. Additionally, the resource manager may include in the tombstone an indication of a location at which the data item has been relocated. For example, in some embodiments the cold tier may provide a detailed address in a cold tier storage or a cold tier file of the cold tier where the relocated data item has been stored and the resource manager may include the detailed address information in the tombstone for the relocated data item.

In some embodiments, a client may further specify other attributes of a warm tier, cold tier, or may specify how data items are to be relocated between a warm and cold tier. For example, in some embodiments one or more additional client specifications 118 may include a specification of a database format for the warm tier, such as such as any of the following database formats: Aerospike, ArangoDB, Couchbase, Amazon Dynamo DB, FairCom c-tree ACE, Foundation DB, HyperDex, InfinityDB, MemcacheDB, MUMPS, Oracle NoSQL Database, OrientDB, Redis, Riak, Berkley DB, Google Engine, etc. Also, a client may specify a storage format for a cold tier. In some embodiments, a client may specify a service or storage system to be used for a warm tier and/or may specify a service or storage system to be used for a cold tier, such as in tiering destination policies 116. For example, a client may specify that Amazon's Dynamo DB service is to be used for the warm tier and may also specify that Amazon's S3 service is to be used for the cold tier. Also, a client may specify whether data is to be stored in secure (e.g. encrypted) or regular storage tiers.

Figure 3:
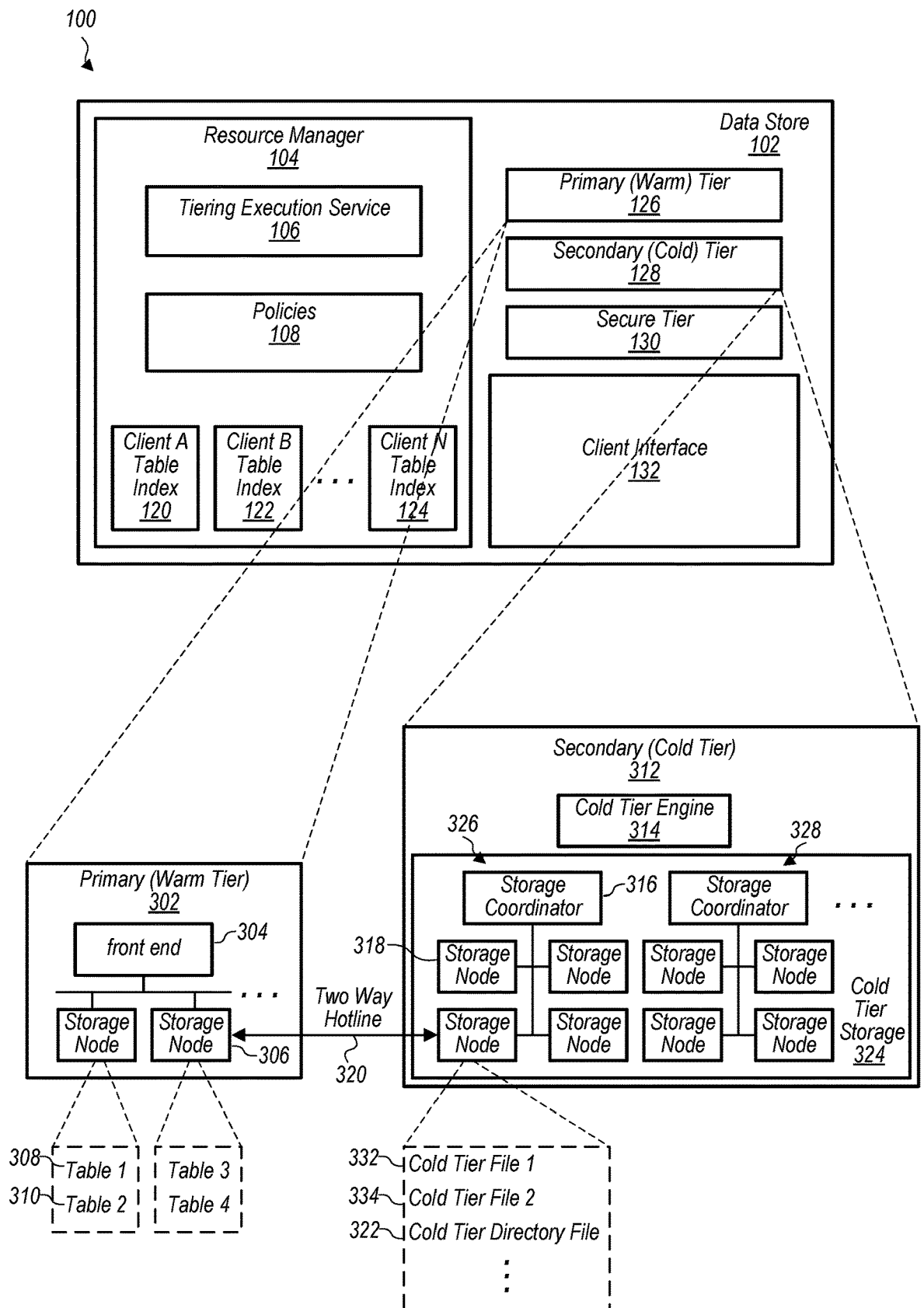
FIG. 3 illustrates further aspects of a warm (primary) tier and a cold (secondary) tier of a data store, according to some embodiments.

FIG. 3 illustrates further aspects of a warm (primary) tier and a cold (secondary) tier of a data store, according to some embodiments.

FIG. 3 illustrates a detailed view of an example warm tier 302 that illustrates at least one possible configuration for warm tier 126 according to at least some embodiments. It is noted that where one or more instances of a given component may exist, reference to that component herein below may be made in either the singular or the plural. However, usage of either form is not intended to preclude the other. In various embodiments, the components illustrated in warm tier 302 may be implemented directly within computer hardware, as instructions directly or indirectly executable by computer hardware (e.g., a microprocessor or computer system), or using a combination of these techniques. For example, the components of warm tier 302 may be implemented by a distributed system including a number of computing nodes (or simply, nodes), such as the computer node embodiment illustrated in FIG. 13 and discussed below. In various embodiments, the functionality of a given storage service system component of a warm tier may be implemented by a particular computing node or may be distributed across several computing nodes. In some embodiments, a given computing node may implement the functionality of more than one storage service system component of a warm tier.

Generally speaking, storage service clients, such as client A 144, client B 146, or client N 148, may encompass any type of client configurable to submit web services requests to warm tier 302 via network 142. For example, a given storage service client, such as client A 144, may include a suitable version of a web browser, or a plugin module or other type of code module configured to execute as an extension to or within an execution environment provided by a web browser to provide storage service clients (e.g., client applications, users, and/or subscribers) access to the data storage services provided by warm tier 302. Alternatively, a storage service client, such as client A 144, may encompass an application such as a database application, media application, office application or any other application that may make use of persistent storage resources. In some embodiments, such an application may include sufficient protocol support (e.g., for a suitable version of Hypertext Transfer Protocol (HTTP)) for generating and processing web services requests without necessarily implementing full browser support for all types of web-based data. That is, a storage service client, such as client A 144, may be an application configured to interact directly with data store 102. In various embodiments, storage service client may be configured to generate web services requests according to a Representational State Transfer (REST)-style web services architecture, a document- or message-based web services architecture, or another suitable web services architecture.

Storage service clients, such as client A 144, client B 146, or client N 148, may convey web services requests to and receive responses from data store 102 via network client interface 132 and network 142. In various embodiments, network 142 may encompass any suitable combination of networking hardware and protocols necessary to establish web-based communications between clients 144, 146, or 148 and data store 102. For example, network 142 may generally encompass the various telecommunications networks and service providers that collectively implement the Internet. Network 142 may also include private networks such as local area networks (LANs) or wide area networks (WANs) as well as public or private wireless networks. For example, both a given client 144, 146, or 148 and data store 102 may be respectively provisioned within enterprises having their own internal networks. In such an embodiment, network 142 may include the hardware (e.g., modems, routers, switches, load balancers, proxy servers, etc.) and software (e.g., protocol stacks, accounting software, firewall/security software, etc.) necessary to establish a networking link between given client 144, 146, or 148 and the Internet as well as between the Internet and data store 102. It is noted that in some embodiments, storage service clients may communicate with data store 102 using a private network rather than the public Internet. For example, clients may be provisioned within the same enterprise as the data store (and/or the underlying system) described herein. In such a case, clients may communicate with data store 102 entirely through a private network 142 (e.g., a LAN or WAN that may use Internet-based communication protocols but which is not publicly accessible).

Generally speaking, data store 102 may be configured to implement one or more service endpoints configured to receive and process web services requests, such as requests to access tables maintained on behalf of clients/users by a data storage service, and/or the items and attributes stored in those tables. For example, data store 102 may include hardware and/or software configured to implement various service endpoints and to properly receive and process HTTP-based web services requests directed to those endpoints. In one embodiment, warm tier 302 may be implemented as a server system configured to receive web services requests from clients via client interface 132 and to forward them to various components that collectively implement a data storage system for processing. In other embodiments, warm tier 302 may be configured as a number of distinct systems (e.g., in a cluster topology) implementing load balancing and other request management features configured to dynamically manage large-scale web services request processing loads.

As illustrated in FIG. 3, warm tier 302 may include a front end 304 (which may be configured to receive, authenticate, parse, throttle and/or dispatch service requests, among other things), one or more administrative components, or auto admin instances (not shown), (which may be configured to provide a variety of visibility and/or control functions), and a plurality of storage node instances (shown as storage nodes 306), each of which may maintain and manage one or more tables on behalf of clients/users or on behalf of the data storage service (and its underlying system) itself.

In addition to functioning as an addressable endpoint for clients' web services requests, in some embodiments, warm tier 302 may implement various client management features. For example, warm tier 302 may coordinate the metering and accounting of client usage of web services, including storage resources, such as by tracking the identities of requesting clients, the number and/or frequency of client requests, the size of tables and/or items stored or retrieved on behalf of clients, overall storage bandwidth used by clients, class of storage requested by clients, and/or any other measurable client usage parameter.

FIG. 3 also illustrates a detailed view of an example hardware implementation of cold tier 312 that illustrates at least one possible configuration for cold tier 128 according to at least some embodiments.

In the illustrated embodiment shown in FIG. 3, cold tier 312 includes a cold tier engine 314 and a cold tier storage 324. The cold tier storage 324 is shown including two areas 326 and 328. Each of areas 326 and 328 includes a respective coordinator instance 316. Areas 326 and 328 may also include various combinations of storage nodes 318, wherein at least one of the storage nodes is a keymap instance.

In one embodiment each of areas 326 and 328 may be considered a locus of independent or weakly correlated failure. That is, the probability of any given area experiencing a failure may be generally independent from or uncorrelated with the probability of failure of any other given area, or the correlation of failure probability may be less than a threshold amount.

Areas 326 and 328 may include additional levels of hierarchy (not shown). Additionally, different cold tier components may communicate according to any suitable type of communication protocol. For example, where certain cold tier components are implemented as discrete applications or executable processes, they may communicate with one another using standard interprocess communication techniques that may be provided by an operating system or platform (e.g., remote procedure calls, queues, mailboxes, sockets, etc.), or by using standard or proprietary platform-independent communication protocols. Such protocols may include stateful or stateless protocols that may support arbitrary levels of handshaking/acknowledgement, error detection and correction, or other communication features as may be required or desired for the communicating cold tier components. For example, in one cold tier embodiment, a substantial degree of inter-component communication may be implemented using a suitable Internet transport layer protocol, such as a version of Transmission Control Protocol (TCP), User Datagram Protocol (UDP) or a similar standard or proprietary transport protocol. However, it is also contemplated that communications among cold tier components may be implemented using protocols at higher layers of protocol abstraction.

In some embodiments, data items stored in a cold tier, such as cold tier 312, may be structured as objects and stored in secure, durable, highly scalable object storage in storage locations referred to as "buckets." For example, in embodiments in which colt tier 312 is implemented using Amazon's S3 service, an S3 object may include data, a key, and metadata. The object key (or key name) may uniquely identify the key-addressable object in a bucket, and an index of such keys may also be maintained as a key map in at least one of the storage nodes 318.

In some embodiments, data items selected for tiering from client tables stored in a warm tier such as data items from tables 1, 2, 3, or 4, may be included in a cold tier file such as cold tier file 1 (332) and cold tier file 2 (334) stored in one of storage nodes 318 of cold tier 312. In some embodiments, a cold tier file may be a flat file without an internal hierarchy. The flat file may also be a write once read many times file also referred to as a read only database (RODB) file. In some embodiments, a cold tier may further include a cold tier directory file, such as cold tier directory file 322. The cold tier directory file may include an index of key values for data items that have been relocated to the cold tier and associated mappings of storage locations in the cold tier files, e.g. cold tier file 1 or cold tier file 2, where the corresponding data items are stored. In some embodiments, a resource manager, such as resource manager 104, may store a data item that is to be relocated to a cold tier to a storage node in the cold tier storage and send a notification to a cold tier engine, such as cold tier engine 314, that the data item has been added to a cold tier storage of the cold tier. In response, the cold tier engine may add a key value and mapping for the data item to a cold tier directory file, such as cold tier directory file 322. In some embodiments, a cold tier engine may add the data item to an existing cold tier file, such as one of cold tier files 1 (332) or 2 (334), by reading the cold tier file into memory, appending the data item into the cold tier file and storing a new version of the cold tier file that includes the data item.

In some embodiments, a cold tier engine, such as cold tier engine 314, may maintain a cache of the most recently stored or accessed data items stored in a cold tier, such as cold tier 312. In some embodiments, a cold tier engine may provide a requested data item from cache memory without accessing the data item from one of storage nodes 318. In some embodiments, cold tier files, such as cold tier files 1 (332) and 2 (334) may be named with a "table_name/date format". Wherein the name indicates that the cold tier file includes data items from a specific table and the date indicates a date when the cold tier file was created or last modified. From the perspective of the cold tier storage, a cold tier file may be just a blob of data wherein data items are bytes of data within the blob of data. However, the mappings in the cold tier directory file may enable a cold tier engine, such as cold tier engine 314, to locate specific bytes of data within a cold tier file that represent a particular data item.

Also in some embodiments, specific address information for a data item stored in a cold tier file may be communicated to a resource manager, such as resource manager 104, and the resource manager may cause the address information to be included in a tombstone for the data item that has been relocated from the warm tier to the cold tier. Also, in some embodiments, a cold tier engine, such as cold tier engine 314, may communicate directly with a warm tier node, such as one of nodes 306, to provide address information to be included in a tombstone for a data item that has been relocated from the storage node of the warm tier to the cold tier.

In some embodiments, a node of a warm tier, such as one of nodes 306, may communicate directly with a storage node of a cold tier, such as one of storage nodes 318 via a two-way hotline, such as two-way hotline 320 to retrieve a data item from the cold tier. For example, a tombstone may store detailed address information for a data item that includes which bytes of data in a cold tier file correspond with the data item. Thus, a node of a warm tier may request particular bytes of data from a cold tier file and thus short circuit a routing manager and cold tier engine, such as routing manager 134 and cold tier engine 314, when accessing a data item stored in the cold tier, such as cold tier 312. Such short circuiting may enable shorter response times for access to data items that have been relocated to a cold tier than if a routing manager had to redirect a request to a cold tier engine and the cold tier engine then had to read a mapping out of a cold tier directory file, such as cold tier directory file 322.

Also, in some embodiments, instead of using a two-way hotline, a routing manager, such as routing manager 134, may read detailed address information for a relocated data item from the data item's tombstone and use the address information to retrieve the data item from the cold tier. For example, the detailed address information may include information about which bytes within a cold tier file correspond to the data item. Thus, the routing manager may communicate directly with the cold tier storage, such as via a storage coordinator 316. This may allow the routing manager to short circuit a cold tier engine, such as cold tier engine 314, and thus eliminate the step of the cold tier engine determining the mapping for the data item based on the cold tier directory file.

In yet another embodiment, a node of warm tier may store less detailed address information for a data item stored in a cold tier. In such embodiments, a storage node of the warm tier may communicate with a cold tier engine bypassing a routing manger, such as routing manager 134. For recently accessed data items that are stored in the cache of the cold tier engine, this may provide faster response times than two-way hotline 320. However, for data items that are no longer stored in the cache of a cold tier engine, such as cold tier engine 314, response times may be slower than the storage node of the warm tier directly accessing the data item via a two-way hotline, such as two-way hotline 320.

In yet another embodiment, a tombstone included in a table such as one of tables 1 (308), 2 (310), 3, or 4 stored in a warm tier, such as warm tier 302, may simply indicate that a data item has been relocated to a cold tier, such as cold tier 312. In such embodiments, a routing manager, such as routing manager 134, may query a cold tier engine, such as cold tier engine 314, for the data item. The cold tier engine may locate the data item and corresponding mapping in a cold tier directory file, such as cold tier directory file 322. The cold tier engine may also retrieve the requested data item based on the mapping determined from the cold tier directory file and return the requested data item to the routing manager. The routing manger, such as routing manager 134, may then provide the data item to a client that requested the data item or may provide the data item to the warm tier if the request to access the data item alters the data item, for example a write request directed at the data item.

In some embodiments, tiers such as warm tier 126 and cold tier 128, of a data store that implements a client-configurable data tiering service, may be transparent to the client after submitting client specifications to select policies for the tiering service. For example, from a client's perspective table 1 (308) that includes at least some data items stored in warm tier 126 and at least some data items that have been relocated to cold tier 128 may appear to the client as a single unified data set and may not appear to the client as different data sets stored in different tiers of a data store.

Figure 4:
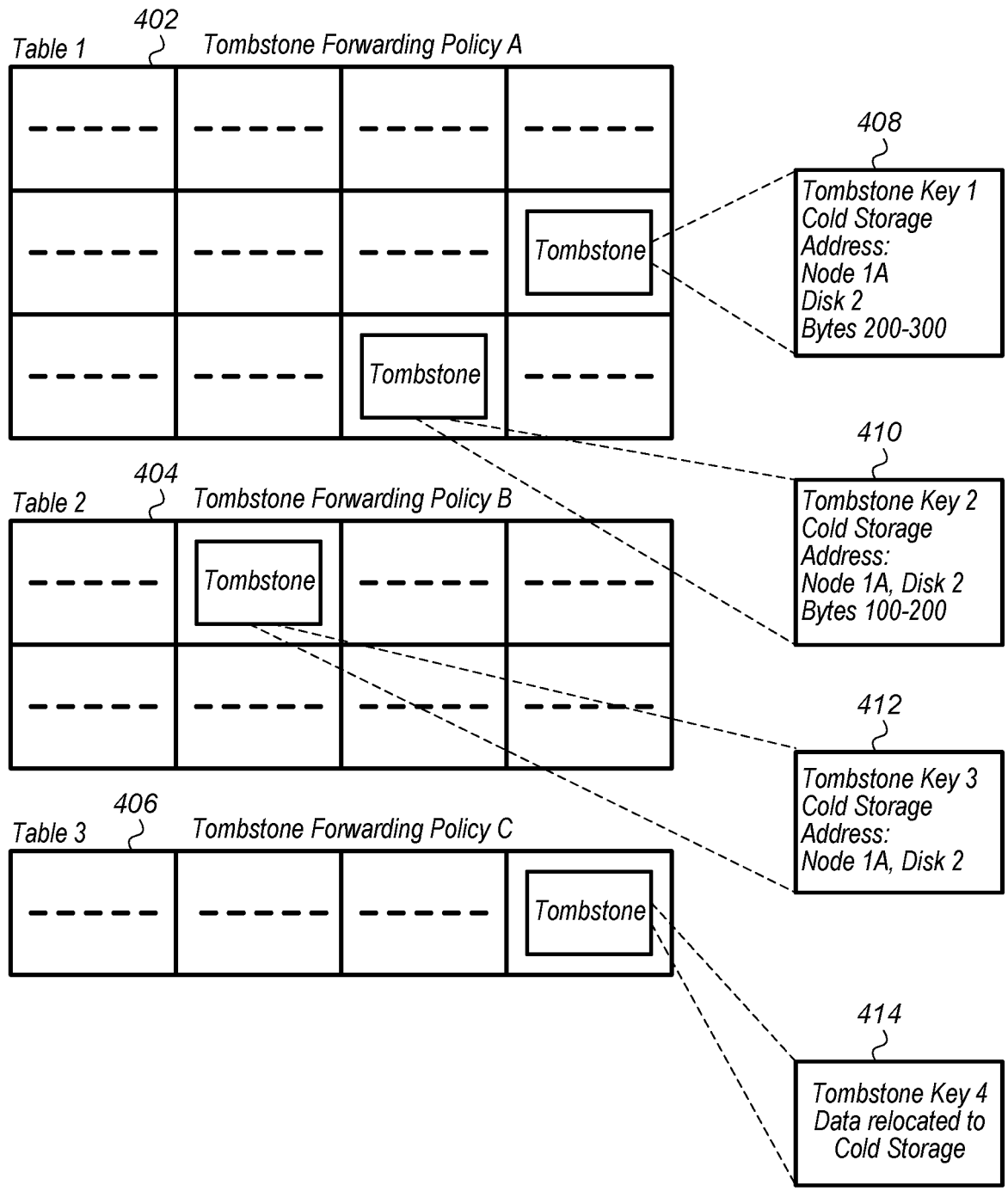
FIG. 4 illustrates tombstones that include location information for data items that have been relocated from a warm (primary) tier to a cold (secondary) tier, according to some embodiments.

FIG. 4 illustrates tombstones that include address information for data items that have been relocated from a warm (primary) tier to a cold (secondary) tier, according to some embodiments. Table 1 (402) may be the same as table 1 (308) described in FIG. 3. In some embodiments, in accordance with a client specified tiering policy and client specified tombstone forwarding policy, one or more data items included in a table or scope stored in a warm tier of a data store may be relocated to a cold tier. For example tombstone 408 and tombstone 410 represent data items that have been relocated to a cold tier. In some embodiments, a client specified tombstone forwarding policy may specify that detailed address information for a relocated data item is to be included in a tombstone for the relocated data item. For example, tombstone 408 indicates that data item with "key 1" has been relocated to cold storage node 1A, disk 2, and that the data item is stored in bytes 200-300 of a cold tier file for table 1. In a similar manner, tombstone 410 indicates that a data item with "key 2" is stored at bytes 100-200 of the cold tier file for table 1.

As another example, a different tombstone forwarding policy may have been selected for table 2 (404). The different tombstone policy may specify that less detailed address information is to be included in tombstones for data items relocated from table 2 than was required for data items that were relocated from table 1. For example, tombstone 412 indicates that a data item with "key 3" is stored in a cold tier file for table 3 (406) located on node 1A, disk 2, but does not indicate the particular bytes within the cold tier file for table 2 at which the data item is located. In such embodiments, a cold tier directory file may further be used to determine the bytes within the cold tier file for table 2 that correspond with the data item for key 3.

In yet another example, a tombstone forwarding policy selected for table 3 may require that location information included in the tombstone indicates that the data item has been relocated to a cold tier, but may not require that the location information include a particular address within the cold tier at which the relocated data item is stored. For example, tombstone 414 simply indicates that data item with "key 4" has been relocated to cold storage. When such a tombstone forwarding policy is selected, a routing manger may then query a cold tier engine for the data item with "key 4" and the cold tier engine may determine particular address information for the data item with key 4 from a cold tier directory file stored in the cold tier.

Illustrative Method of Configuring a Client-Configurable Tiering Service

Figure 5:
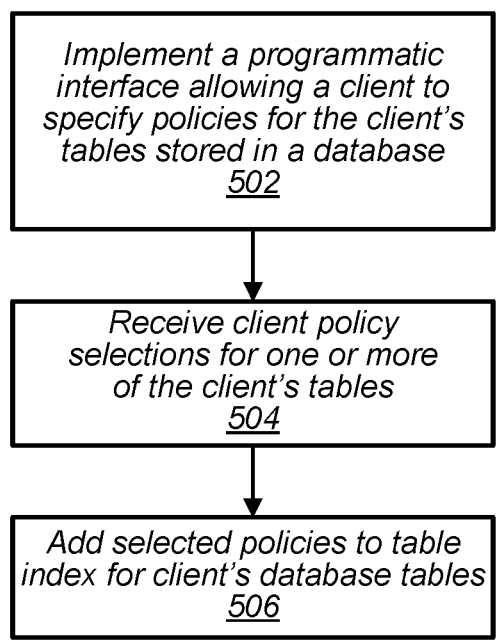
FIG. 5 is a flowchart illustrating a method for configuring a tiering service in accordance with client specified tiering policies, according to some embodiments.

FIG. 5 is a flowchart illustrating a method for configuring a tiering service in accordance with client specified tiering policies, according to some embodiments.

At 502, a programmatic interface is implemented that allows a client of a client-configurable tiering service or a data store that includes a client-configurable data tiering service to specify policies to be applied to the client's tables or scopes. In some embodiments, the programmatic interface may provide an interface to a stand-alone client-configurable tiering service, or in embodiments wherein the client-configurable tiering service is integrated into a data store, the programmatic interface may provide an interface to the data store.

At 504 one or more client policy selections are received for one or more of the client's tables or scopes. In some embodiments, a client may select different policies for different ones of the client's tables or scopes, or may select at least some policies that are to apply to multiple ones of the client's tables or scopes. For example, in embodiments in which a client-configurable tiering policy is integrated into a data store, a client may specify policies that apply to all of the client's tables stored in the data store, or may specify different policies to be applied to different sub-sets of the client's tables or scopes stored in the data store or to individual tables or scopes stored in the data store.

In embodiments wherein a client-configurable data tiering service is a stand-alone service, a programmatic interface of the client-configurable data tiering service may support client selection of data stores to be managed by the client-configurable tiering service. For example, a client may provide a specification of an existing database stored in a data store to be a warm tier managed by the client-configurable tiering service and may also specify an additional storage system to function as a cold tier. In some embodiments, a client may select a storage service, such as a database service, to function as a warm tier and may select another storage service, such as a lower cost object-based storage service, to function as a cold tier. Additionally, in some embodiments, a client may specify via the programmatic interface one or more storage protocols that are to be used to implement a warm tier or a cold tier.

Also, a client may specify, via the programmatic interface, a tiering policy, a tiering schedule, a tombstone forwarding policy, etc. to be applied to the client's tables or scopes. In some embodiments, different policies may be specified for different tables or scopes. Also, some policies may be specified to apply to all tables. For example, a client may select a common tiering policy to be applied to the client's tables stored in a data store, but may specify different tiering schedules to be applied to different ones of the client's tables stored in the data store. In some embodiments, a client may specify other polices such as a secure tiering policy.

At 506, a configuration manager of a client-configurable data tiering service or a data store that includes a client configurable data tiering service may add the client's policy selections to an index for the client's database tables, such as one of the client table indexes 120, 122, or 124 described in FIGS. 1-2.

Illustrative Method of Execution of a Client Selected Tiering Policy

Figure 6:
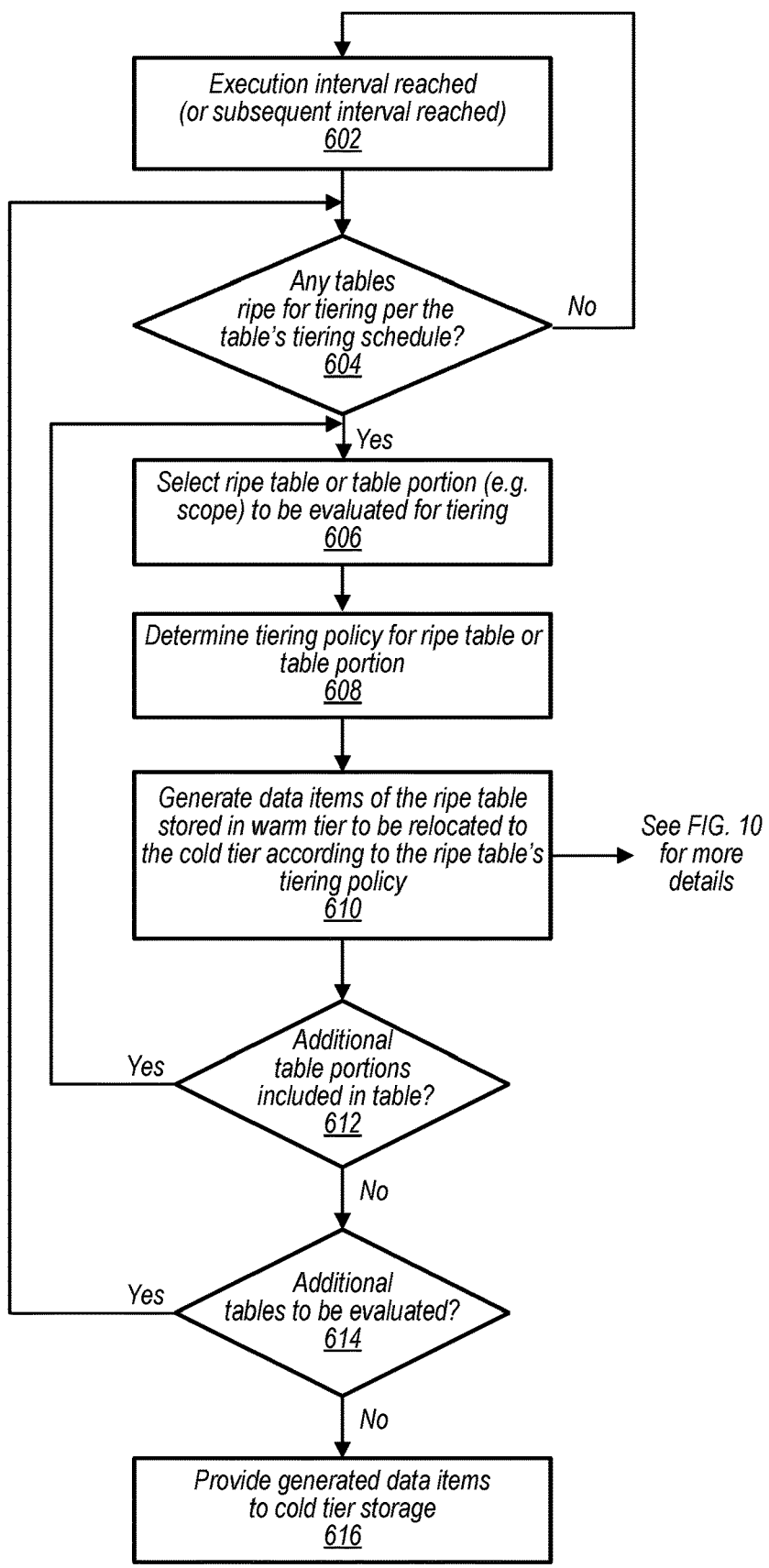
FIG. 6 is a flowchart illustrating a method for generating data items stored in a warm (primary) tier to be relocated to a cold (secondary) tier in accordance with one or more client specified policies, according to some embodiments.

FIG. 6 is a flowchart illustrating a method for generating data items stored in a warm (primary) tier to be relocated to a cold (secondary) tier in accordance with one or more client specified policies, according to some embodiments.

At 602, a tiering interval is reached for a tiering execution service, such as tiering execution service 106. For example, in some embodiments, a tiering execution service may be configured to evaluate table indexes for tables that are ripe for tiering at predetermined time intervals. For example, a tiering execution service may be configured with a tiering interval of one day, such that a tiering execution service evaluates whether tables are ripe for tiering on a daily basis. In some embodiments, other tiering intervals may be applied, such as weekly, monthly, etc.

In order to determine if a table is ripe for tiering, a tiering execution service may compare a length of time since a table was last evaluated for tiering against a tiering schedule for the table. For example, table 1 (308) included in client A table index 120 has a daily tiering schedule. Thus, in a system in which a tiering interval is one day, table 1 may be ripe for tiering at each daily tiering interval. As another example, table 2 (310) included in client A table index 120 has a monthly tiering schedule. Thus, in a system with a daily tiering interval, the tiering execution service may reach a tiering interval, but may determine table 2 is not ripe for tiering if it has not been one month since the last time table 2 was evaluated for tiering. This process is shown at 604 where it is determined if there are any tables that are ripe for tiering per the respective table's tiering schedules. If there are not any tables that are ripe for tiering, the process reverts to 602 until the next tiering interval is reached.

At 606, a table or portion of a table that is ripe for tiering is selected to be evaluated. Evaluating the table may include identifying data items included in the table that are to be relocated to a cold tier per a selected tiering policy that is being applied to the particular ripe table. For example, at 608 a tiering policy that applies to the ripe table that is to be evaluated is determined by the tiering execution service. Determining a tiering policy that applies to a given table may comprise querying a client table index, such as client A table index 120, to determine a tiering policy selected for the ripe table. For example, client A table index 120 indicates that a time based tiering policy is to be applied to table 1 and an access pattern based tiering policy is to be applied to table 2.

At 610 data items included in the ripe table may be evaluated based on the tiering policy associated with the ripe table. Data items that are to be relocated to a cold tier according to the ripe table's tiering policy may be generated. For example, a copy of data items stored in a warm tier that are to be relocated to a cold tier may be generated. In some embodiments, the data items stored in the warm tier may remain in the warm tier until confirmation is received at the warm tier that the data items have been successfully relocated to the cold tier. At this point, the respective copies of the data items remaining in the warm tier may be marked for deletion and deleted from the warm tier. Various tiering policies may be used to determine data items that are to be relocated to a cold tier, wherein a client selects tiering policies for respective tables from the various tiering policies supported by the client-configurable data tiering service. FIGS. 10A-10E include additional details regarding at least some tiering policies from which a client may select a tiering policy to be applied to the client's tables or scopes.

At 612 it is determined if there are additional table portions of a ripe table that are to be evaluated to determine if the table portion includes data items that are to be relocated from a warm tier to a cold tier per the table's selected tiering policy. In some embodiments, a table may only include a single portion, or in some embodiments a table may be divided into partitions such that different portions of the table are stored on different storage nodes of a warm tier of a data store. If there are additional portions of the table to be evaluated, the process reverts to 606.

At 614, it is determined if there are additional tables that have not yet been evaluated to determine if they are ripe for tiering. If there are additional tables that have not yet been evaluated for ripeness by the tiering execution service, the process reverts to 604 and the additional tables are evaluated to determine if they are ripe for tiering. If there are not additional tables that have not been evaluated, the generated data items are provided to a cold tier storage of a cold tier at 616.

Illustrative Method of Processing a Data Item Relocated from a Warm Tier

Figure 7:
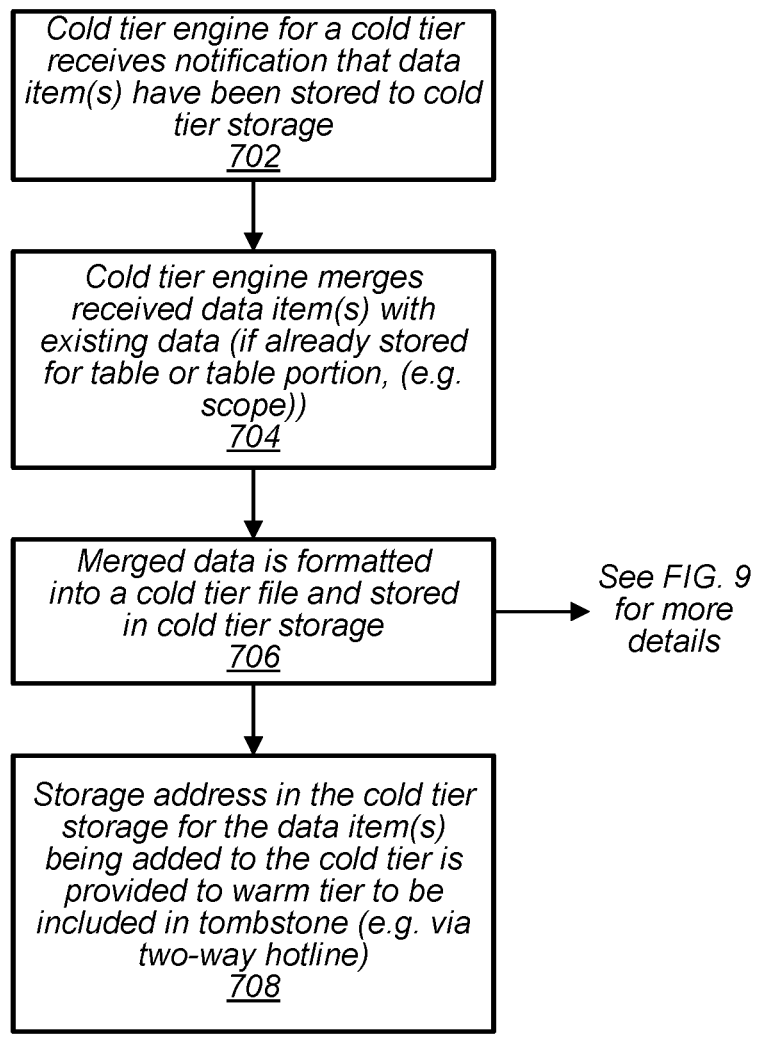
FIG. 7 is a flowchart illustrating a method for including data items from a warm (primary) tier into a cold (secondary) tier, according to some embodiments.

FIG. 7 is a flowchart illustrating a method for including data items from a warm tier (primary) tier into a cold (secondary) tier, according to some embodiments.

At 702 a cold tier engine for a secondary or cold tier receives a notification from a warm tier that one or more data items have been stored to a storage node of a cold tier storage of the cold tier. For example, the one or more data items may be data items generated and provided to a cold tier storage as discussed above in regard to 612. The data items may be stored in a node of a cold tier storage, such as one of storage nodes 318 of cold tier storage 324 illustrated in FIG. 3. In some embodiments, a notification to a cold tier engine that one or more data items have been added to a cold tier may be a simple notification service (SNS) message issued from a warm tier. For example, cold tier engine 314 may receive an SNS message from warm tier 302 or a storage node 306 of warm tier 302 indicating that one or more data items have been relocated from warm tier 302 and added to one or more of storage nodes 318 of cold tier storage 324.

At 704, the cold tier engine merges the data items received from the warm tier with existing data stored in the cold tier storage for the table from which the data items have been relocated. Or, if there is not an existing cold tier file for the table, a cold tier file is created for the table and the data items are included in the newly created cold tier file. For example, the relocated data items may be merged into a cold tier file such as one of cold tier files 332 or 334.

At 706, the merged data is formatted into a flat file without an internal hierarchy, referred to herein as a cold tier file. The cold tier file is then stored in a storage node of a cold tier storage of the cold tier.

At 708 the storage location of the data item in the cold tier file and the storage location of the cold tier file in the cold tier storage system are communicated back to the storage node of the warm tier from which the data item was relocated. The warm tier then includes the storage location information for the data item in a tombstone for the data item maintained in the warm tier. Additionally, as discussed in more detail in regard to FIG. 9, the cold tier engine adds a mapping for the data item included in the merged cold tier file in a cold tier directory file, such as cold tier directory file 322. In some embodiments, a two-way hotline may be established between the cold tier engine and the node of the warm tier from which the data item has been relocated. The address information to be included in the tombstone may be communicated from the cold tier engine to the node of the warm tier via the two-way hotline such that the communication short circuits a routing manager of the data store, such as routing manager 134.

Illustrative Process for Generating a Tombstone to include in a Warm Tier

Figure 8:
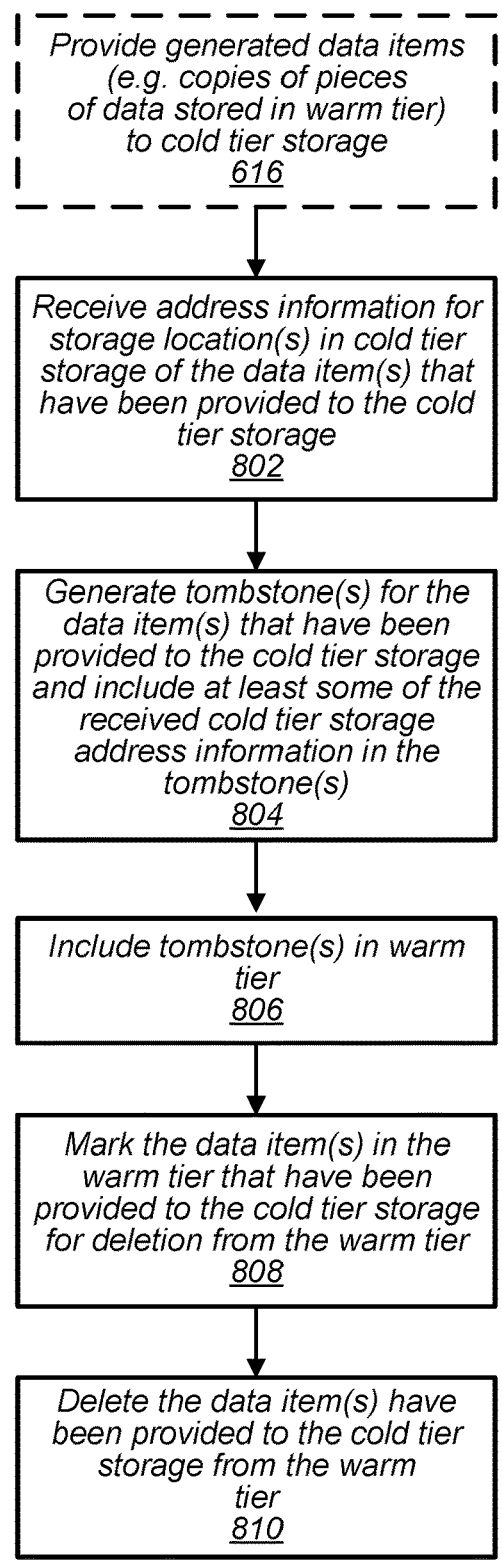
FIG. 8 is a flowchart illustrating a method for adding tombstone(s) to a warm (primary) tier for data items that have been relocated to a cold (secondary) tier and deleting the data items from the warm tier, according to some embodiments.

FIG. 8 is a flowchart illustrating a method for adding tombstone(s) to a warm (primary) tier for data items that have been relocated to a cold (secondary) tier and deleting the data items from the warm (primary) tier, according to some embodiments.

At 802 a storage node of a warm tier that has provided generated data items to a cold tier (as in 616) in accordance with a tiering policy for a table including the data items, receives location information for storage locations of the relocated data items. The location information indicates an address in the cold tier where the relocated data items are stored. In some embodiments, more or less detailed address information may be provided to a node of a warm tier based on a selected tombstone forwarding policy for the table. In some embodiments, detailed address information may be provided and only a portion of the detailed address information provided to the warm tier node may be included in a warm tier tombstone. For example, if a tombstone forwarding policy is selected for a table that does not specify that data item location information within a cold tier file is to be included in a tombstone for the data item, some of the location information provided to the warm tier node may not be included in a tombstone to be included in the warm tier for the data item.

At 804, in response to providing the generated data item to the cold tier (as in 616) and receiving location information for the data item (as in 802) the warm tier generates a tombstone for the relocated data item that includes location information for locating the relocated data item in the cold tier. As discussed above, a level of detail of the location information to be included in a tombstone may vary based on a client selected tombstone forwarding policy that is associated with the table in which the tombstone is being included.

At 806, the tombstone is included in the table (that included the relocated data item). The tombstone may act as a place holder for the relocated data item, but may occupy less storage space in the warm tier than the data item that is being relocated to the cold tier.

At 808, after a tombstone has been added to the warm tier for a data item being relocated to the cold tier, the original copy of the data item remaining in the warm tier may be marked for deletion and may be deleted at 810. In some embodiments, deletion of original copies of data items that have been relocated from a warm tier to a cold tier may be performed synchronously or asynchronously. For example, in some embodiments, a warm tier may include a clean-up utility that deletes data items marked for deletion as a group instead of deleting each data item individually as the data items are relocated to a cold tier.

Creating/Updating a Cold Tier Directory File

Figure 9:
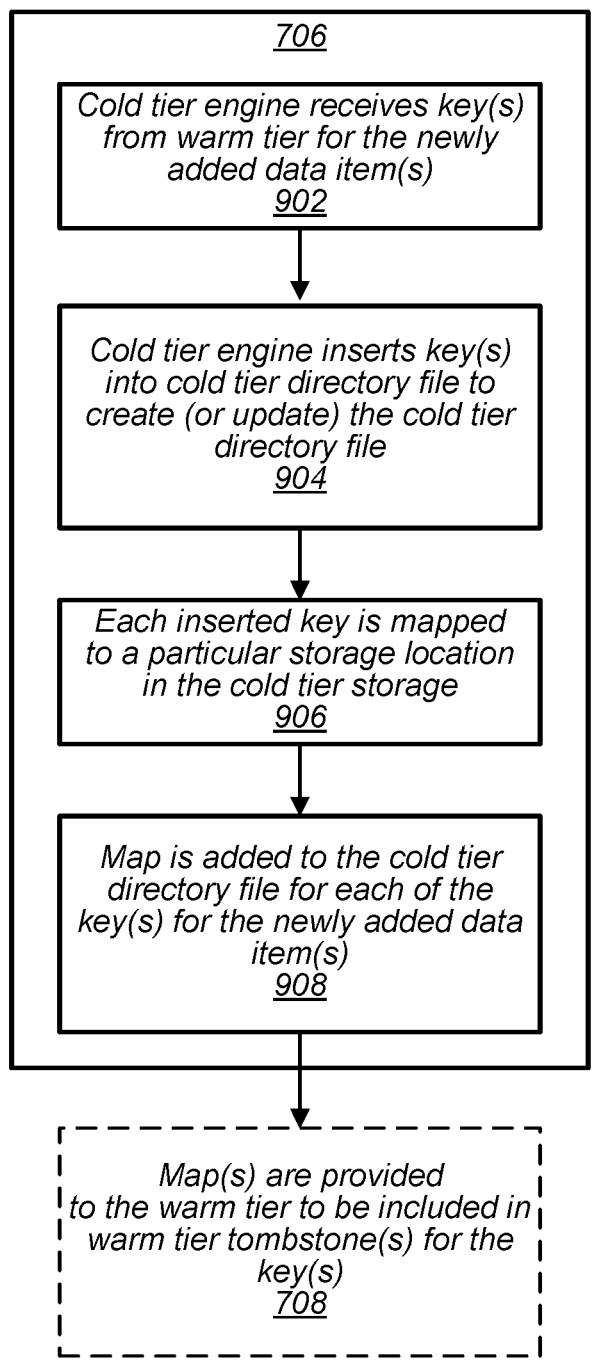
FIG. 9 is a flowchart illustrating creation or modification of a cold tier file that references data items that have been relocated from a warm (primary) tier to a cold (secondary) tier, according to some embodiments.

FIG. 9 is a flowchart illustrating creation or modification of a cold tier file that references data items that have been relocated from a warm (primary) tier to a cold (secondary) tier, according to some embodiments. FIG. 9 further illustrates steps that may be performed in conjunction with updating or creating a cold tier file, providing address information to a warm tier for a data item that has been relocated to a cold tier, and including address information for the relocated data item in a cold tier file of the cold tier, as described in 706 and 708 of FIG. 7.

At 902, a cold tier engine of a cold tier, e.g. cold tier engine 314 of cold tier 312, receives one or more key values for one or more corresponding data items that have been relocated to the cold tier. At 904, the cold tier engine inserts the key values for the newly added data items into a cold tier directory file, such as cold tier directory file 322 described in regard to FIG. 3. At 906, a mapping is created for each inserted key wherein the mapping indicates a location where a data item corresponding to the key is stored. In some embodiments, the mapping includes detailed address information for a storage location of the data item in the cold tier. For example, address information included in a mapping may indicate particular bytes of data within a cold tier file, such as one of cold tier files 332 or 334, wherein the relocated data item is stored. At 908 respective mappings are added to the cold tier directory file for each corresponding data item being added to the cold tier directory file. As shown in FIG. 9, the detailed address information included in the mapping for a respective relocated data item may also be provided to a node of a warm tier to include in a tombstone for the relocated data item, as described in 708 in regard to FIG. 7.

Example Time Based Tiering Policy

Figure 10A:
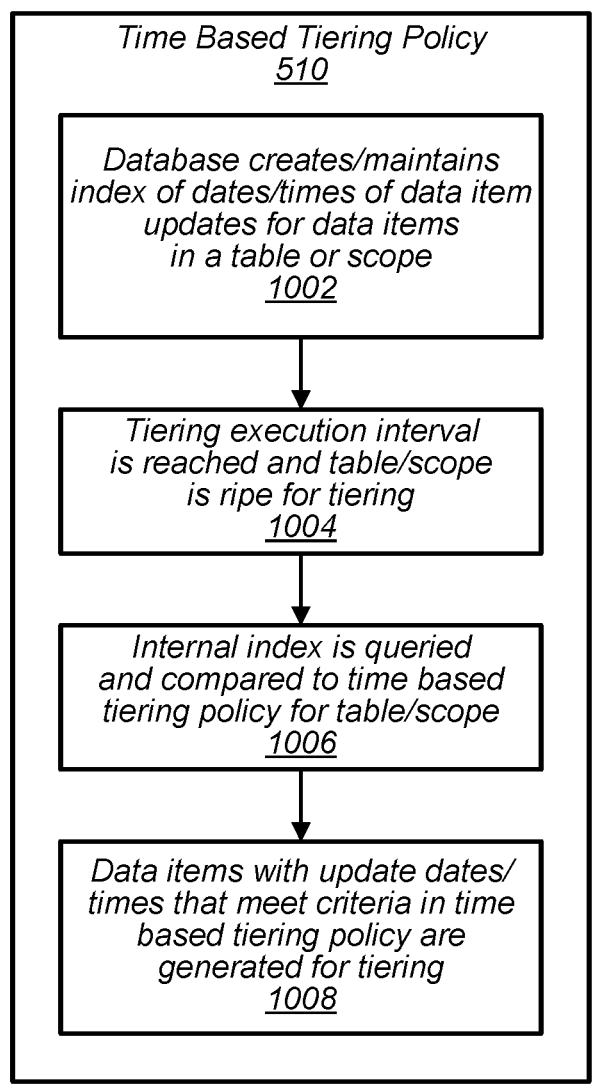
FIG. 10A is a flowchart further illustrating generation of data items to be relocated from a warm (primary) tier to a cold (secondary) tier according to a time based tiering policy, according to some embodiments.

FIG. 10A is a flowchart further illustrating generation of data items to be relocated from a warm (primary) tier to a cold (secondary) tier according to a time based tiering policy, according to some embodiments.

At 1002 a warm tier creates or maintains a log or an index of dates and/or times when data operations are performed on data items included in a client's table or scope stored in the warm tier. For example, a database may maintain a log or index of read operations, write operations, a time when the table or scope was created, last modified, last accessed, etc. When a tiering execution interval is reached and the table is ripe for tiering, at 1004, the log or index may be evaluated against a time based tiering policy. The time based tiering policy may specify that data items with a time since last read/modified/accessed, etc. that is greater than a threshold amount of time are to be relocated to a cold tier. In some embodiments, a time based tiering policy may specify that data items with a time since last written or created that is greater than a threshold amount of time are to be relocated to a cold tier. In some embodiments, other actions performed on a data item may be initiating events against which a time threshold for maintaining the data item in the warm tier is evaluated, wherein data items stored in the warm tier longer than the time threshold are to be relocated to the cold tier per the time based tiering policy. In order to determine a data item, for which an amount of time the data item has been stored in a warm tier since a particular initiating event from which time is being measured exceeds a time threshold, may be determined by querying the log or index created or maintained at 1002 and comparing the results of the query to the tiering policy for the table. At 1008, data items identified to be relocated to the cold tier per the tiering policy for the table are generated for relocation to the cold tier.

Example Access Pattern Based Tiering Policy

Figure 10B:
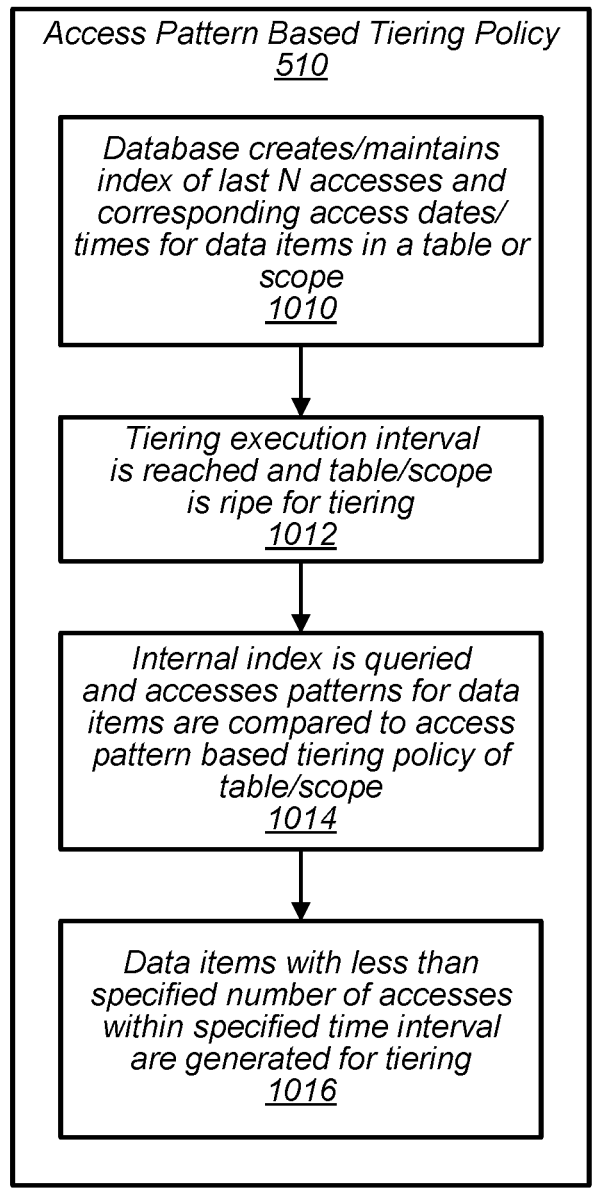
FIG. 10B is a flowchart further illustrating generation of data items to be relocated from a warm (primary) tier to a cold (secondary) tier according to an access pattern based tiering policy, according to some embodiments.

FIG. 10B is a flowchart further illustrating generation of data items to be relocated from a warm (primary) tier to a cold (secondary) tier according to an access pattern based tiering policy, according to some embodiments.

At 1010 a warm tier creates or maintains a log or an index of dates and/or times when data operations are performed on data items included in a client's table or scope stored in the warm tier. For example, a database may maintain a log or index of read operations, write operations, a time when a table or scope included in a database was created, last modified, last accessed, etc. In some embodiments, an access pattern based tiering policy may specify that a database is to maintain a log of the last N accesses to data items stored in a table governed by the access pattern based tiering policy, where N is a number of accesses specified in the access pattern based tiering policy. When a tiering execution interval is reached and the table is ripe for tiering, at 1012, the log or index may be evaluated against the access pattern based tiering policy for the table. The access pattern based tiering policy may specify that data items with less than a particular number of accesses during a specified time interval are to be relocated to a cold tier. For example, an access pattern based tiering policy may specify that data items with fewer than N reads in the last minute, hour, day, etc. are to be located to a cold tier. In some embodiments other types of accesses may be used in an access pattern based tiering policy, such as writes performed on a data item. Also, other types of access patterns may be included in an access pattern based tiering policy to specify conditions upon which data items are to be relocated from a warm tier according to the access pattern based tiering policy. At 1014 the log or index that includes a record of access for data items in the table or scope is evaluated based on rules included in the access pattern based tiering policy to identify data items that are to be relocated to the cold tier. At 1016, data items identified to be relocated to the cold tier per the access pattern based tiering policy selected for the table are generated for relocation to the cold tier.

Example Metadata Based Tiering Policy

Figure 10C:
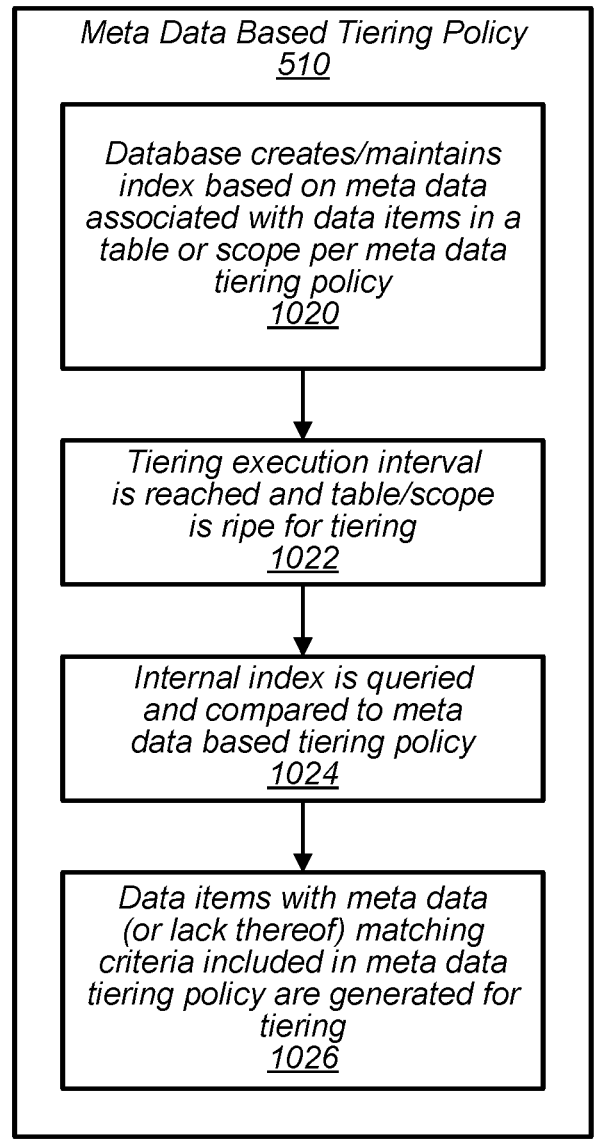
FIG. 10C is a flowchart further illustrating generation of data items to be relocated from a warm (primary) tier to a cold (secondary) tier according to a metadata based tiering policy, according to some embodiments.

FIG. 10C is a flowchart further illustrating generation of data items to be relocated from a warm (primary) tier to a cold (secondary) tier according to a metadata based tiering policy, according to some embodiments.

At 1020 a warm tier creates or maintains an index of metadata associated with data items included in a table or scope stored in the warm tier on behalf of a client per a selected metadata based tiering policy selected for the table or scope. In some embodiments, the index may include entries for data items that having certain types of associated metadata. For example, the index may include entries for data items with certain types of associated metadata and no entries in the index for other data items for which there is not the certain type of associated metadata. For example, the index may indicate existence or non-existence of certain types of metadata for respective data items. When a tiering execution interval is reached, at 1022, the index may be evaluated against the metadata based tiering policy. The metadata based tiering policy may specify that data items lacking certain types of metadata are to be relocated to a cold tier. Conversely, a metadata tiering policy may specify that data items having certain types of associated metadata are to be relocated to a cold tier. In addition to tiering data items based on existence versus non-existence of certain types of metadata, a metadata tiering policy may, in some embodiments, may specify that data items are to be tiered based on the content of the metadata. For example, metadata may include an indication of an author of a most recent write to a data item, and a metadata tiering policy may include a rule that data items last updated by a particular author are to be tiered. In some embodiments, other types of metadata may be used in a metadata based tiering policy. At 1024 the index of the metadata for the table or scope is evaluated based on rules included in the metadata based tiering policy to identify data items that are to be relocated to the cold tier. At 1026, data items identified to be relocated to the cold tier per the metadata based tiering policy selected for the table are generated for relocation to the cold tier.

Example Prefix Based Tiering Policy

Figure 10D:
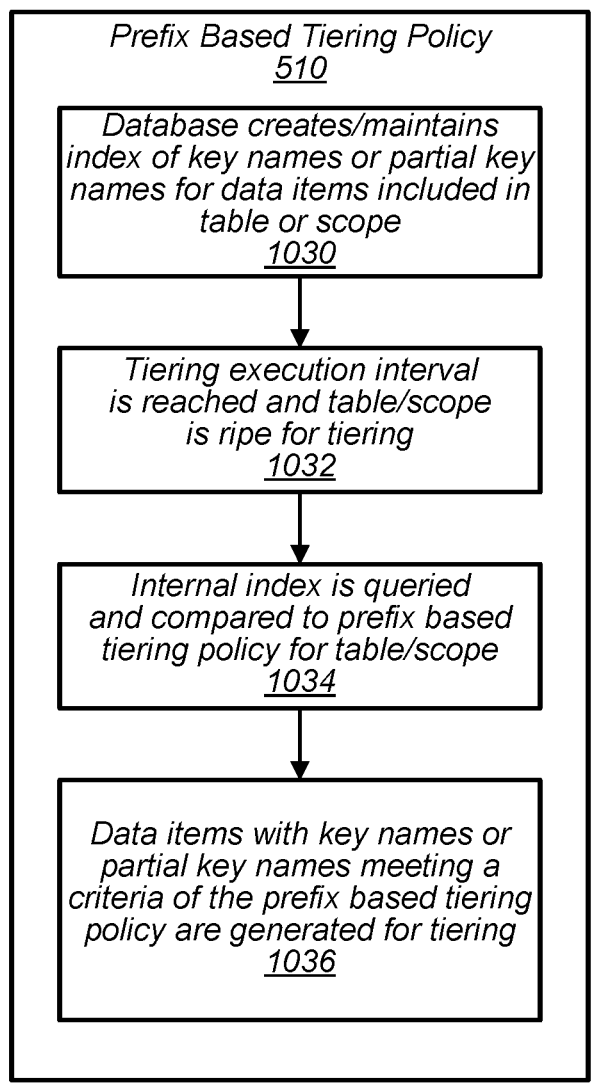
FIG. 10D is a flowchart further illustrating generation of data items to be relocated from a warm (primary) tier to a cold (secondary) tier according to a prefix based tiering policy, according to some embodiments.

FIG. 10D is a flowchart further illustrating generation of data items to be relocated from a warm (primary) tier to a cold (secondary) tier according to a prefix based tiering policy, according to some embodiments.

At 1030 the warm tier creates or maintains an index of key names or partial key names or other address information or naming information for data items included in a client's table or scope stored in the warm tier. For example, a database may maintain an index of data items having common prefixes wherein data items are assigned keys, addresses, or names according to a common convention. In some embodiments, a resource manager of a client configurable tiering service, such as resource manager 104, may create or maintain an index of key names, partial key names, etc. For example, in some embodiments, a prefix of an address or name may indicate a location where the data item is stored or may correlate to an attribute of the data item.

When a tiering execution interval is reached and a table is ripe for tiering, at 1032, the index may be evaluated against the prefix based tiering policy selected for the table. The prefix based tiering policy may specify that data items included in the table with prefixes comprising certain attributes are to be relocated to a cold tier. For example, a naming convention in a database system or for a table may be that all orders are assigned prefixes beginning with "ORD". In such a system, a prefix based tiering policy may specify that data items beginning with the prefix "ORD" are to be relocated to a cold tier, whereas other data items having other prefixes are not to be relocated to a cold tier, are to be relocated to a different cold tier, or are to be relocated to another tier according to a different tiering schedule. At 1034, the index that includes prefixes for the data items in the table or scope is evaluated based on rules included in the prefix based tiering policy to identify data items that are to be relocated to the cold tier. At 1036, data items identified to be relocated to the cold tier per the prefix based tiering policy selected for the table are generated for relocation to the cold tier.

Example Size Based Tiering Policy

Figure 10E:
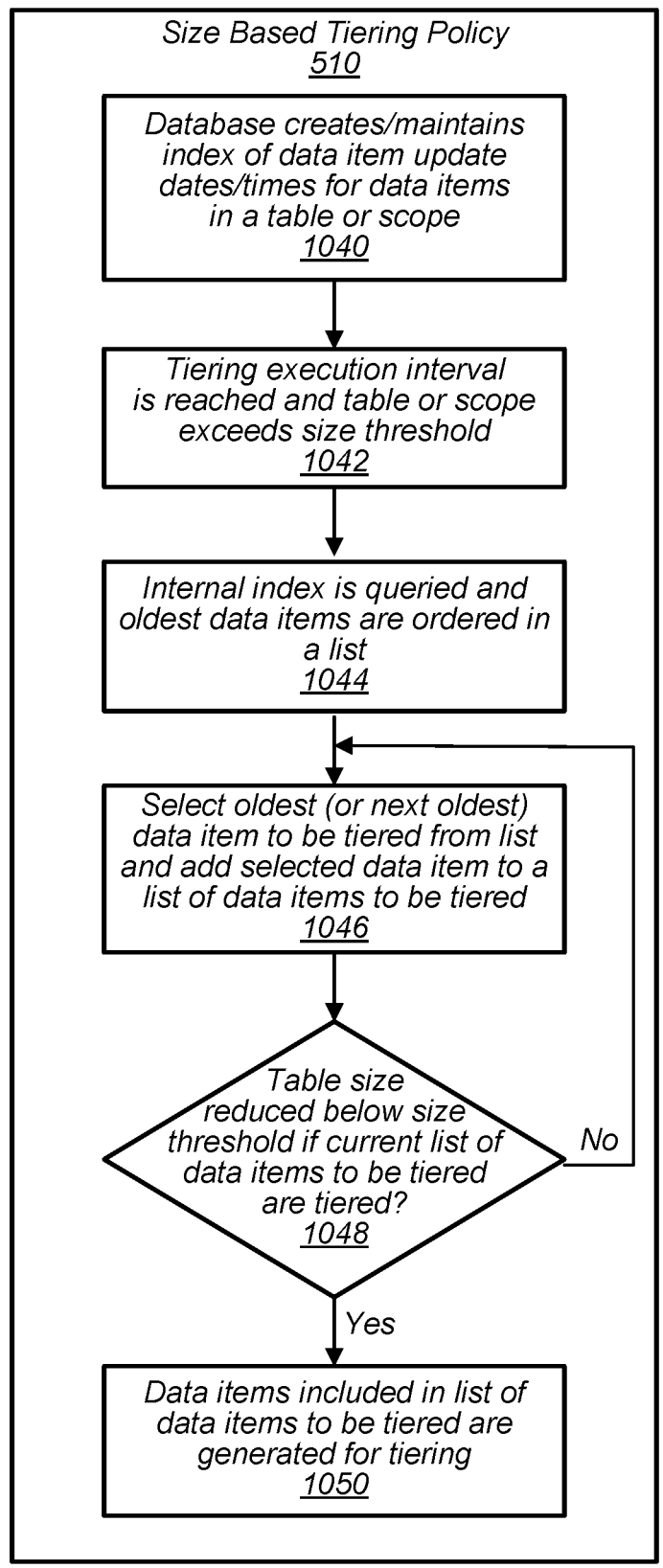
FIG. 10E is a flowchart further illustrating generation of data items to be relocated from a warm (primary) tier to a cold (secondary) tier according to a size based tiering policy, according to some embodiments.

FIG. 10E is a flowchart further illustrating generation of data items to be relocated from a warm (primary) tier to a cold (secondary) tier according to a size based tiering policy, according to some embodiments.

At 1010 a warm tier creates or maintains a log or an index of dates and/or times when data operations are performed on data items included in a client's table or scope stored in the warm tier. This log or index may be similar to a log or index used in a time based or access pattern based tiering policy as described above. However, a size based tiering policy may specify that data items are to be relocated to a cold tier when a size of a table or scope exceeds a threshold size limit. In some embodiments, once the size limit threshold is reached, data items may be prioritized to be relocated to a cold tier based on length of time in the warm tier, access pattern, metadata, prefix, etc. as described above in regards to FIGS. 10A-D. When a tiering execution interval is reached, at 1042, it determined whether the table is ripe for evaluating for tiering per the table's tiering schedule and it is determined if a size of the table exceeds a size threshold for the table. If the table is not ripe for tiering or the size of the table does not exceed the size threshold for the table, tiering may not be performed on the table during the current execution interval, but may be evaluated for tiering during subsequent execution intervals to determine if the table is ripe for tiering and whether a size of the table exceeds the size threshold specified in the size based tiering policy selected for the table.

If the table is ripe for tiering and the size of the table exceeds the size threshold for the table per the sized based tiering policy, at 1044, the internal index is queried and the data items are ordered. For example the data items may be ordered in a list based on age, frequency of access, types of metadata, prefixes, etc. At 1046, the lowest priority data item of the ordered data items (e.g. the oldest, least accessed, etc.) is selected to be relocated to the cold tier. At 1048 it is determined if relocating the selected data item to the cold tier would cause the table size of the table to fall below the size limit threshold for the table. If not, the next lowest priority data item is selected to be relocated to the cold tier (e.g. revert back to 1046). At 1050, once a sufficient number of low priority data items are identified to be relocated to the cold tier per the size based tiering policy for the table such that the size of the table will be reduced below the size limit threshold, the identified data items are generated for relocation to the cold tier.

Example Tombstone Forwarding Policies

FIGS. 11A-11C illustrate performing an access to a data item that has been relocated to a cold tier according to various example tombstone forwarding policies.

FIG. 11A is a flowchart illustrating a node of a warm (primary) tier interacting with a resource manager to access a data item that has been relocated to a cold (secondary) tier, according to some embodiments.

At 1102 a node of a warm tier receives an indication from a routing manager, such as routing manager 134, that a data item of a table stored in the node of the warm tier is to be accessed, wherein the data item has been relocated from the node of the warm tier to a cold tier and replaced with a tombstone in the warm tier. According to at least some tombstone policies, at 1104 the node of the warm tier reads a particular address of a cold storage file and of a location in the cold storage file comprising the data item that is included in a tombstone for the data item stored in the warm tier. At 1106, the node of the warm tier then reads the data item from the cold tier file stored in the cold tier storage via a two-way hotline between the node of the warm tier and a node of the cold tier storage. For example, according to a selected tombstone forwarding policy for the tombstone, the tombstone may include specific address information about the data item, such as particular bytes within a cold tier file where the data item is stored. Thus, when this tombstone policy is selected, the warm tier node may short circuit a cold tier engine, such as cold tier engine 314, and read the relocated data item directly from a node of the cold tier storage. At 1108, the node of the warm tier may then provide the data item retrieved from the cold tier storage via the two-way hotline to the routing manager.

FIG. 11B is a flowchart illustrating a node of a warm (primary) tier interacting with a resource manager to access a data item that has been relocated to a cold (secondary) tier, according to some embodiments.

In the embodiment illustrated in FIG. 11B, a different tombstone forwarding policy may have been selected for a table that is different from the tombstone forwarding policy selected in FIG. 11A. At 1120 a node of a warm tier receives an indication from a routing manager, such as routing manager 134, that a data item of a table stored in the node of the warm tier is to be accessed, wherein the data item has been relocated from the node of the warm tier to a cold tier and replaced with a tombstone. According to the different tombstone policy, at 1122 the node of the warm tier reads a particular address in the cold storage and in a cold storage file for the data item that is included in the tombstone for the data item. At 1124 the node of the warm tier provides the particular address to the routing manager. The routing manger then provides the particular cold tier storage address to the cold tier to retrieve the data item. In some embodiments, the particular address may include specific address information about the data item, such as particular bytes within a cold tier file where the data item is stored. Thus, when this tombstone policy is selected, the routing manager may short circuit a cold tier engine, such as cold tier engine 314, and read the relocated data item directly from a node of the cold tier storage. In some embodiments, a client may select such a tombstone forwarding policy due to control or latency limitations related to allowing a warm node tier to directly access data from a cold tier, such as in the tombstone forwarding policy described in regard to FIG. 11A. For example, a routing manager, when attempting to access a data item, may require a response from a warm tier within a certain amount of time that precludes the warm tier from accessing the data item from the cold tier. In some embodiments, such a tombstone forwarding policy may be selected for other reasons.

FIG. 11C is a flowchart illustrating a node of a warm (primary) tier interacting with a resource manager to access a data item that has been relocated to a cold (secondary) tier, according to some embodiments.

In the embodiment illustrated in FIG. 11C, yet a different tombstone forwarding policy may have been selected that is different from the tombstone forwarding policy selected in FIG. 11A or in FIG. 11B. At 1130 a node of a warm tier receives an indication from a routing manager, such as routing manager 134, that a data item of a table stored in the node of the warm tier is to be accessed, wherein the data item has been relocated from the node of the warm tier to a cold tier and replaced with a tombstone. According to the other different selected tombstone policy, at 1130 the node of the warm tier reads the tombstone which includes an indication that the data item has been relocated to the cold tier. However, when this other different tombstone policy is selected, the tombstone may not include specific address information for where the data item is stored in the cold tier. In this case, the routing manager may query the cold tier engine, such as cold tier engine 314, for the data item. The cold tier engine may then query a cold tier directory file to determine where the data item is stored in the cold tier storage. In some embodiments, the cold tier engine may then retrieve the data item and provide it to the routing manager or may provide the routing manager with detailed address information and the routing manger may retrieve the data item from the cold tier storage using the address information provided by the cold tier engine. In some embodiments, the cold tier engine may cache recently access data items in a cache for the cold tier. Thus, this other different tombstone policy may provide lower latency responses for recently accessed data items that are stored in the cold tier engine cache, but may provide higher latency responses for data items no longer stored in the cold tier engine's cache.

Example Process for Rehydrating a Data Item from a Cold Tier to a Warm Tier

Figure 12:
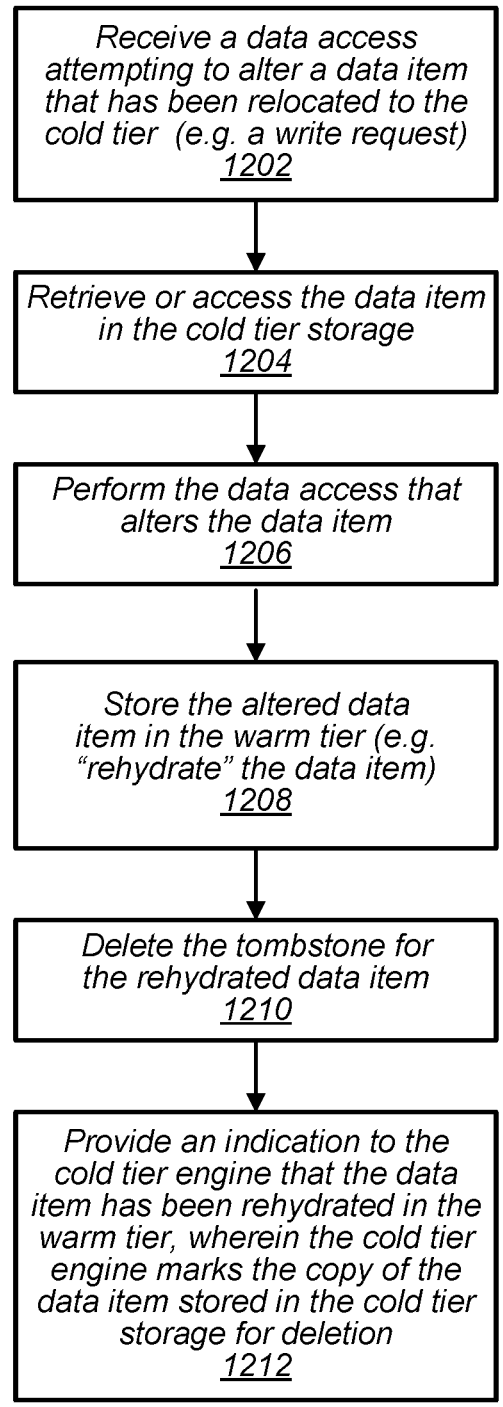
FIG. 12 is a flowchart illustrating a node of a warm (primary) tier interacting with a resource manager in response to an access attempting to alter a data item that has been relocated to a cold (secondary) tier, according to some embodiments.

FIG. 12 is a flowchart illustrating a node of a warm (primary) tier interacting with a resource manager in response to an access attempting to alter a data item that has been relocated to a cold (secondary) tier, according to some embodiments.

At 1202 a warm tier receives a data access attempting to alter a data item that has been relocated to a cold tier and that is represented in the warm tier by a tombstone. For example, a warm tier may receive a write request or other mutating operation request to alter a data item of a table maintained in the warm tier. At 1204 the data item is retrieved or access from the cold tier according to a selected tombstone forwarding policy for the table and according to location information for the data item included in the tombstone. At 1206 the data access operation that alters the data item is performed on the data item. In some embodiments, the access operation that alters the data item, e.g. a write operation, etc., is performed at a node of the warm tier after the data item is retrieved from the cold tier. In some embodiments, the data access operation that alters the data item may be performed on the data item at a node of the cold tier and subsequently the modified version of the data item after the access operation has been performed may be provided to the warm tier.

At 1208, the altered data item is stored in the warm or primary tier. At 1210 the tombstone for the data item that has been "rehydrated" to the warm tier, e.g. relocated from the cold tier back to the warm tier, is marked for deletion. The tombstone for the data item may then by deleted synchronously or asynchronously. At 1212, an indication is provided to the cold tier that the data item has been successfully rehydrated into the warm tier. In response, the cold tier marks the copy of the data item remaining in the cold tier for deletion from the cold tier storage. In some embodiments, the cold tier engine may further update a cold tier directory file to remove the mapping of the key for the data item from a cold tier directory file.

Illustrative Computer System

Figure 13:
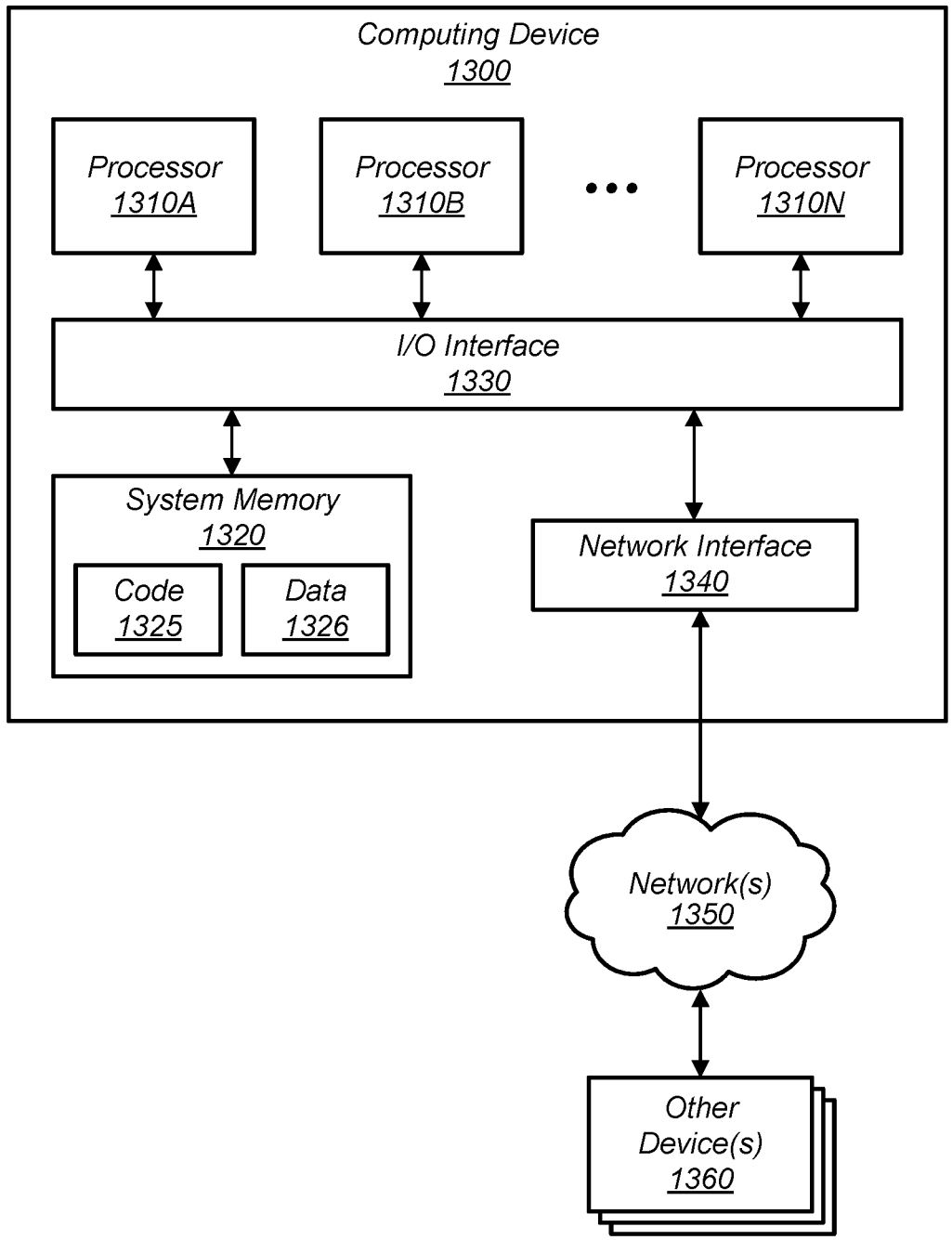
FIG. 13 illustrates an example computing device that may be used in some embodiments.

In at least some embodiments, a computer system that implements a portion or all of one or more of the technologies described herein may include a computer system that includes or is configured to access one or more computer-readable media. FIG. 13 illustrates such a computing device 1300. In the illustrated embodiment, computing device 1300 includes one or more processors 1310A-1310N coupled to a system memory 1320 via an input/output (I/O) interface 1330. Computing device 1300 further includes a network interface 1340 coupled to I/O interface 1330.

In various embodiments, computing device 1300 may be a uniprocessor system including one processor or a multi-processor system including several processors 1310A-1310N (e.g., two, four, eight, or another suitable number). Processors 1310A-1310N may include any suitable processors capable of executing instructions. For example, in various embodiments, processors 1310A-1310N may be processors implementing any of a variety of instruction set architectures (ISAs), such as the x86, PowerPC, SPARC, or MIPS ISAs, or any other suitable ISA. In multiprocessor systems, each of processors 1310A-1310N may commonly, but not necessarily, implement the same ISA.

System memory 1320 may be configured to store program instructions and data accessible by processor(s) 1310A-1310N. In various embodiments, system memory 1320 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1320 as code (i.e., program instructions) 1325 and data 1326.

In one embodiment, I/O interface 1330 may be configured to coordinate I/O traffic between processors 1310A-1310N, system memory 1320, and any peripheral devices in the device, including network interface 1340 or other peripheral interfaces. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments some or all of the functionality of I/O interface 1330, such as an interface to system memory 1320, may be incorporated directly into processors 1310A-1310N.

Network interface 1340 may be configured to allow data to be exchanged between computing device 1300 and other devices 1360 attached to a network or networks 1350. In various embodiments, network interface 1340 may support communication via any suitable wired or wireless general data networks, such as types of Ethernet network, for example. Additionally, network interface 1340 may support communication via telecommunications/telephony networks such as analog voice networks or digital fiber communications networks, via storage area networks such as Fibre Channel SANs, or via any other suitable type of network and/or protocol.

In some embodiments, system memory 1320 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 1300 via I/O interface 1330. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 1300 as system memory 1320 or another type of memory. Further, a computer-readable medium may include transmission media or signals such as electrical, electromagnetic, or digital signals, conveyed via a communication medium such as a network and/or a wireless link, such as may be implemented via network interface 1340. Portions or all of multiple computing devices such as that illustrated in FIG. 13 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
a data store comprising a warm tier and a cold tier, wherein the warm tier is configured to have a first data access latency, the cold tier is configured to have a second data access latency, and the first data access latency is less than the second data access latency;
a configuration manager configured to:
implement a programmatic interface allowing a client of the data store to select policies for client data stored in the data store; and
receive, via the programmatic interface:
an indication of a selected tiering policy comprising conditions responsive to which one or more pieces of client data are to be relocated from the warm tier to the cold tier, wherein the selected tiering policy is selected from a plurality of tiering policies supported by the data store; and
an indication of a selected tombstone forwarding policy, wherein the selected tombstone forwarding policy is selected from a plurality of tombstone forwarding policies supported by the data store, wherein, for a given piece of client data that has been relocated to the cold tier, different ones of the tombstone forwarding policies provide different access times for locating the given piece of client data in the cold tier, and;
a resource manager configured to:
relocate the one or more pieces of client data from the warm tier to the cold tier in accordance with the conditions included in the selected tiering policy; and
include one or more respective tombstones in the warm tier, wherein respective ones of the tombstones comprise an indication of a location for a piece of client data that has been relocated from the warm tier to the cold tier, wherein the indication of the location is in accordance with the selected tombstone forwarding policy; and
a routing manager configured to:
receive a request directed to one of the one or more pieces of client data that have been relocated from the warm tier to the cold tier;
locate, in response to the request, a tombstone included in the warm tier corresponding to the requested one of the one or more pieces of client data that have been relocated to the cold tier; and
provide the requested piece of client data that has been relocated to the cold tier, wherein the piece of client data relocated to the cold tier is accessed based on the indication of the location included in a respective tombstone included in the warm tier and is accessed in accordance with the selected tombstone forwarding policy.

2. The system of claim 1, wherein the configuration manager is further configured to:
receive an indication of a selected database format or service to be used for the warm tier; and
implement the warm tier in accordance with the selected database format or service.

3. The system of claim 1, wherein the configuration manager is further configured to:
receive an indication of a selected storage system or service to be used for the cold tier; and
implement the cold tier on the selected storage system or service.

4. The system of claim 1, wherein the selected tiering policy comprises one or more of:
a time-based tiering policy, wherein pieces of client data stored in the warm tier are relocated to the cold tier based on an amount of time the pieces of client data have been stored in the warm tier;
an access pattern-based tiering policy, wherein pieces of client data stored in the warm tier are relocated to the cold tier based on a frequency of accesses to the pieces of client data during a time interval;
a metadata-based tiering policy, wherein pieces of client data stored in the warm tier are relocated to the cold tier based on metadata values associated with keys corresponding to the pieces of client data or a lack of metadata values for keys corresponding to the pieces of client data;
a prefix-based tiering policy, wherein pieces of client data stored in the warm tier are relocated to the cold tier based on at least a portion of a prefix associated with the pieces of client data; or
a sized-based tiering policy, wherein pieces of client data stored in the warm tier are relocated to the cold tier based on a size of a table that includes the pieces of client data.

5. The system of claim 1, wherein the selected tombstone forwarding policy comprises one or more of:
a tombstone forwarding policy wherein a node of the warm tier storing the tombstone retrieves the requested piece of client data from the cold tier via a two-way hotline between the warm tier node and a cold tier node according to an address stored in the tombstone and provides the requested piece of client data to the routing manager;
another tombstone forwarding policy, wherein a node of the warm tier storing the tombstone provides an address stored in the tombstone to the routing manager and the routing manager accesses the requested piece of client data stored in the cold tier using the provided address; or
an additional tombstone forwarding policy, wherein a node of the warm tier storing the tombstone provides an indication to the routing manager that the requested piece of client data has been relocated to the cold tier, wherein the routing manager requests the requested piece of client data from a cold tier engine for the cold tier and the cold tier engine determines the address for the requested piece of client data in the cold tier.

6. The system of claim 1, wherein the data store further comprises a secure tier, wherein the selected tiering policy is selected from a set of supported tiering policies comprising at least a secure storage tiering policy.

7. A method, comprising:
receiving, via a programmatic interface to a data store:
an indication of a selected tiering policy comprising conditions responsive to which data stored in a warm tier is to be relocated from the warm tier to a cold tier, wherein the warm tier is configured to have a first data access latency, the cold tier is configured to have a second data access latency, and the first data access latency is less than the second data access latency, and wherein the selected tiering policy is selected from a plurality of tiering policies supported by the data store; and
an indication of a selected tombstone policy for accessing data that has been relocated from the warm tier to the cold tier, wherein the selected tombstone policy is selected from a plurality of tombstone policies supported by the data store,
wherein, for a given piece of data that has been relocated to the cold tier, different ones of the tombstone forwarding policies provide different access times for locating the given piece of data in the cold tier;
relocating, responsive to the conditions being met, data from the warm tier to the cold tier in accordance with the selected tiering policy;
including a tombstone in the warm tier indicating a location where the data has been relocated, wherein the location included in the tombstone is in accordance with the selected tombstone policy;
in response to receiving an access request for the data that has been relocated from the warm tier to the cold tier, locating the requested data in the cold tier based on the location included in the tombstone of the warm tier; and
accessing the requested data in the cold tier in accordance with the selected tombstone policy.

8. The method of claim 7, wherein accessing the requested data in the cold tier in accordance with the selected tombstone policy comprises:
accessing, by a node of the warm tier, the requested data in the cold tier according to an address included in the tombstone; and
providing, by the node of the warm tier, the requested data to a routing manager of the data store.

9. The method of claim 8, wherein the node of the warm tier accesses the requested data via a two-way hotline between the node of the warm tier and the node of the cold tier.

10. The method of claim 7, wherein locating the requested data in the cold tier based on the location included in the tombstone and accessing the requested data in the cold tier in accordance with the selected tombstone policy comprises:
providing, by a node of the warm tier, an address included in the tombstone to a cold tier engine;
receiving, by the node of the warm tier, the requested data from the cold tier engine; and
providing, by the node of the warm tier, the requested data to a routing manager of the data store.

11. The method of claim 7, wherein locating the requested data in the cold tier based on the location included in the tombstone and accessing the requested data in the cold tier in accordance with the selected tombstone policy comprises:
providing, by a node of the warm tier, an address included in the tombstone to a routing manager of the data store;
passing, by the routing manager, the address to a cold tier engine for the cold tier; and
receiving, by the routing manager, the requested data from the cold tier engine.

12. The method of claim 7, wherein relocating the data from the warm tier to the cold tier comprises:
providing a copy of the data to the cold tier;
receiving an indication from the cold tier that the data has been stored; and
marking a copy of the data stored in a node of the warm tier for deletion.

13. The method of claim 7, further comprising:
subsequent to receiving the access request, storing a copy of the requested data from the cold tier in the warm tier; and
providing an indication to the cold tier that the requested data has been stored in the warm tier, wherein the cold tier subsequently marks a copy of the requested data remaining in the cold tier for deletion.

14. The method of claim 7, wherein the selected tiering policy comprises one or more of:
a time-based tiering policy, wherein data stored in the warm tier is relocated to the cold tier based on an amount of time that has elapsed since the data was stored in the warm tier;
an access-pattern based tiering policy, wherein data stored in the warm tier is relocated to the cold tier based on a pattern of accesses to the data;
a metadata-based tiering policy, wherein data stored in the warm tier is relocated to the cold tier based on metadata associated with the data;

a prefix-based tiering policy, wherein data stored in the warm tier is relocated to the cold tier based on at least a portion of a value included in an identifier of the data; or a sized-based tiering policy, wherein data stored in the warm tier is relocated to the cold tier based on a size of a table that includes the data.

15. The method of claim 7, wherein the selected tombstone policy comprises one or more of:

a tombstone forwarding policy wherein a node of the warm tier storing the tombstone retrieves the requested data from the cold tier via a two-way hotline between the warm tier node and a cold tier node;

another tombstone forwarding policy, wherein a node of the warm tier storing the tombstone provides an address associated with the tombstone to a routing manager; and an additional tombstone forwarding policy, wherein a node of the warm tier storing the tombstone provides an indication to the routing manager that the requested data has been moved to the cold tier.

16. A non-transitory computer readable medium storing program instructions that, when executed by one or more processors, cause the one or more processors to:

receive, via a programmatic interface, an indication of a selected tiering policy, selected from a plurality of tiering policies supported by a data store comprising a cold tier and a warm tier;

receive, via the programmatic interface, an indication of a selected tombstone forwarding policy, selected from a plurality of tombstone forwarding policies supported by the data store, wherein, for a given piece of data that has been relocated to the cold tier, different ones of the tombstone forwarding policies provide different access times for locating the given piece of data in the cold tier;

provide a copy of a piece of data stored in the warm tier of the data store to the cold tier of the data store in accordance with the selected tiering policy, wherein the warm tier is configured to have a first data access latency, the cold tier is configured to have a second data access latency, and the first data access latency is less than the second data access latency;

include a tombstone in the warm tier comprising an address in the cold tier at which the copy of the piece of data is stored in accordance with the selected tombstone forwarding policy; and in response to an access request for the piece of data, retrieve the copy of the requested piece of data from the cold tier, wherein to retrieve the copy of the requested piece of data from the cold tier, the copy of the requested piece of data is:

located in the cold tier using the address stored in the tombstone of the warm tier; and accessed in the cold tier accordance with the selected tombstone forwarding policy.

17. The non-transitory computer readable medium of claim 16, wherein to retrieve the copy of the requested piece of data from the cold tier the program instructions cause the one or more processors to:

provide the address stored in the tombstone to a cold tier engine; and receive the copy of the requested piece of data from the cold tier engine, wherein said provide the address and said receive the copy of the requested piece of data from the cold tier engine is performed in accordance with the selected tombstone forwarding policy.

18. The non-transitory computer readable medium of claim 16, wherein to retrieve the copy of the requested piece of data from the cold tier the program instructions cause the one or more processors to:

access, by a node of the warm tier via a two-way hotline between the node of the warm tier and a node of the cold tier, the copy of the requested piece of data stored in the cold tier according to the address included in the tombstone of the warm tier, wherein said access of the copy of the requested piece of data via the two-way hotline is performed in accordance with the selected tombstone forwarding policy.

19. The non-transitory computer readable medium of claim 16, wherein the program instructions further cause the one or more processors to:

receive, via a two-way hotline between a node of the warm tier and a node of the cold tier, an indication that the copy of the piece of data has been stored in the cold tier; and mark of the piece of data remaining in the warm tier for deletion.

20. The non-transitory computer readable medium of claim 19, wherein the program instructions further cause the one or more processors to:

subsequent to retrieving the copy of the requested piece of data from the cold tier, provide to the cold tier, via the two-way hotline, an indication that the piece of data has been restored in the warm tier, wherein the cold tier subsequently marks the copy of the piece of data stored in the cold tier for deletion from the cold tier.

* * * * *